(12) United States Patent
Almutairi et al.

(10) Patent No.: US 12,098,865 B2
(45) Date of Patent: *Sep. 24, 2024

(54) EVAPORATIVE COOLING SYSTEM FOR ABLUTION BAY

(71) Applicant: King Fahd University of Petroleum and Minerals, Dhahran (SA)

(72) Inventors: Faisal Bader Almutairi, Dhahran (SA); Fahad Abdulaziz Alsulaiman, Dhahran (SA); Nasiru Ishaq Ibrahim, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,274

(22) Filed: Mar. 13, 2024

(65) Prior Publication Data

US 2024/0280276 A1    Aug. 22, 2024

Related U.S. Application Data

(63) Continuation of application No. 17/672,810, filed on Feb. 16, 2022, now Pat. No. 11,971,194.
(Continued)

(51) Int. Cl.
| | |
|---|---|
| *F24F 5/00* | (2006.01) |
| *C02F 9/00* | (2023.01) |
| *E03B 1/04* | (2006.01) |
| *F28D 5/02* | (2006.01) |
| *F28D 15/04* | (2006.01) |

(Continued)

(52) U.S. Cl.
CPC ............. *F24F 5/0035* (2013.01); *C02F 9/00* (2013.01); *E03B 1/041* (2013.01); *F28D 5/02* (2013.01); *F28D 15/043* (2013.01); *F28F 25/06* (2013.01); *C02F 1/001* (2013.01); *C02F 1/283* (2013.01); *C02F 1/32* (2013.01); *C02F 1/68* (2013.01); *C02F 2103/002* (2013.01); *C02F 2303/04* (2013.01); *F28F 2025/005* (2013.01)

(58) Field of Classification Search
CPC ............................. E03B 1/041; F24F 5/0035
See application file for complete search history.

(56) References Cited

U.S. PATENT DOCUMENTS

| | | |
|---|---|---|
| 4,359,789 A | 11/1982 | Roberts |
| 6,338,258 B1 | 1/2002 | Lee et al. |

(Continued)

FOREIGN PATENT DOCUMENTS

| | | |
|---|---|---|
| CN | 201285228 Y | 8/2009 |
| CN | 111058888 A | 4/2020 |
| CN | 113137679 A | 7/2021 |

*Primary Examiner* — Eric S Ruppert
(74) *Attorney, Agent, or Firm* — Oblon, McClelland, Maier & Neustadt, L.L.P.

(57) ABSTRACT

An indirect evaporative cooling system for cooling a space adjacent to or containing an ablution bay is described. The indirect evaporative cooling system includes a greywater source from the ablution bay and evaporative cooler apparatus located above the space to be cooled in a dome shaped housing. The evaporative cooler apparatus includes a wet channel, at least one spray nozzle, and a dry channel. The at least one spray nozzle is located at the top of the evaporative cooler apparatus and is fluidly connected to the greywater source and the wet channel. The wet channel is located directly above the dry channel. A first side of the dry channel is connected to a first opening with a fan and outside air.

14 Claims, 13 Drawing Sheets

Related U.S. Application Data

(60) Provisional application No. 63/276,910, filed on Nov. 8, 2021.

(51) Int. Cl.
| | |
|---|---|
| *F28F 25/06* | (2006.01) |
| *C02F 1/00* | (2023.01) |
| *C02F 1/28* | (2023.01) |
| *C02F 1/32* | (2023.01) |
| *C02F 1/68* | (2023.01) |
| *C02F 103/00* | (2006.01) |
| *F28F 25/00* | (2006.01) |

(56) References Cited

U.S. PATENT DOCUMENTS

| | | |
|---|---|---|
| 8,553,416 B1 | 10/2013 | Carlson et al. |
| 10,760,830 B2 | 9/2020 | Vandermeulen et al. |
| 2005/0011839 A1 | 1/2005 | Dart et al. |
| 2007/0119787 A1 | 5/2007 | Dart et al. |

EVAPORATIVE COOLING SYSTEM FOR ABLUTION BAY

CROSS REFERENCE TO RELATED APPLICATION

The present application is a Continuation of U.S. application Ser. No. 17/672,810, now allowed, having a filing date of Feb. 16, 2022 which claims benefit of priority to U.S. Provisional Application No. 63/276,910 having a filing date of Nov. 8, 2021 which is incorporated herein by reference in its entirety.

BACKGROUND

Field of the Invention

The present disclosure relates to cooling systems and, more particularly, to reuse treated ablution water for indirect evaporative cooling systems.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

About 40% of the world's total primary energy is consumed by buildings, which contributes to one-third of the total carbon dioxide emission. Heating, ventilation, and air-conditioning (HVAC) systems constitute above 40% of the total energy consumption of buildings, particularly in hot climatic zones. Hence, it is imperative to address the issue of high energy consumption by HVAC systems in a more efficient, and sustainable manner.

Mosques are buildings with intermittent occupancy during daily prayers. The mosques are designed to provide maximum human comfort to worshippers. Meanwhile, a huge amount of water is utilized and discharged in public ablution sites usually located adjacent to the mosques. Ablution is the act of washing parts of the body using clean water. Normally, the ablution is performed in mosque facilities equipped with standard taps with a manual open/closure mechanism and do not use any water-saving features, such as aerators and motion sensors. Thus, a considerable amount of water is wasted during the ablution ritual as water continuously runs from the opened tap with an estimated amount of 2.5-4.5 liters per person. See Aburizaiza OS. Ablution Water: Prospects for Reuse in Flushing of Toilets at Mosques, Schools, and Offices in Saudi Arabia. J King Abdulaziz Univ Sci 2002; 14:3-28, incorporated herein by reference in its entirety.

Therefore, it may be appreciated that the ablution ritual consumes large amount of water. Solutions devised to provide a simple recycling system designed to collect, treat, and reuse the ablution water within a closed-loop system for non-potable water applications, such as toilet flushing, general washing, plant watering and flowerbed cultivation, are known. However, the use of ablution greywater for indirect evaporative cooling of a space inside a building has not yet been explored.

Evaporative cooling is a process that utilizes the heat in air to evaporate water. A substantial amount of heat transmitted from air to water during the evaporation process significantly decreases the air temperature. All evaporative cooling systems utilize water for evaporation, which serves as the cooling medium (refrigerant). In places where water scarcity is a concern, such evaporative systems may not be technically and economically feasible. However, greywater that is normally discharged from an ablution bay, and thus wasted, can be reused for cooling purposes to provide comfort.

Accordingly, it is an object of the present disclosure to provide an indirect evaporative cooling system for cooling a space adjacent or containing an ablution bay. The present disclosure proposes and demonstrates the integration of a Maisotsenko cycle (M-cycle) based cooling system with an ablution greywater treatment system as the water source. Such system (particularly, for mosque air conditioning), is considered for dry and hot climates as a case study, potentially leading to considerable environmental and economic benefits.

SUMMARY OF THE INVENTION

According to an aspect of the present disclosure, an indirect evaporative cooling system for cooling a space adjacent to or containing an ablution bay is described. The ablution bay is adjacent to or contained in the space to be cooled. The ablution bay includes a plurality of water taps; and a greywater drainage system below the plurality of water taps. The indirect evaporative cooling system further includes a greywater storage tank having a first side and a second side; and an evaporative cooler apparatus. The greywater storage tank is fluidly connected to the greywater drainage system of the ablution bay through a piping network at least partially below the ablution bay and/or the space to be cooled. The greywater storage tank is fluidly connected via an outlet to a water pump on the first side of the greywater storage tank, where the outlet is positioned at a mid-height of the greywater storage tank, and the greywater storage tank is connected to the greywater drainage system of the ablution bay on the second side. The greywater storage tank includes a plurality of heat pipes attached on one end perpendicularly to a wall of the greywater storage tank extending outwards. The plurality of heat pipes is equally spaced around the wall of the greywater storage tank. The water pump is fluidly connected to a top of the evaporative cooler apparatus and the evaporative cooler apparatus is located above the space to be cooled in a dome shaped housing. The evaporative cooler apparatus includes a wet channel, at least one spray nozzle, and a dry channel. The at least one spray nozzle is: (a) located at the top of the evaporative cooler apparatus and is fluidly connected to the water pump, and (b) connected to the wet channel. The wet channel is located directly above the dry channel. A first side of the dry channel is connected to a first opening with a fan and outside air. A first side of the wet channel is connected to a first opening to outside air. The first openings of the wet and dry channels are located on a back side of the dome shaped housing facing the opposite direction of an entrance to the space to be cooled.

In some embodiments, at least one water tap of the plurality of water taps includes a manual open/close mechanism.

In some embodiments, the infrared light reflective material on the dome shaped housing is selected from the group consisting of acrylic polymer, asphalt, a polyurethane polymer, and a silicone polymer.

In some embodiments, the water pump is a centrifugal pump or a rotary pump.

In some embodiments, each of the plurality of heat pipes includes a copper enclosure with a copper sintered wick structure extending along a length of the heat pipe; an evaporator section; and a condenser section.

In some embodiments, the indirect evaporative cooling system further includes at least one louver covering at least one of the first openings of the wet and dry channels on the back side of the dome shaped housing.

In some embodiments, the indirect evaporative cooling system further includes a condenser. A first end of the condenser is connected to the first opening of the wet channel of the evaporative cooler apparatus and a second end of the condenser is fluidly connected to at least one spray nozzle located at the top of the evaporative cooler apparatus.

In some embodiments, the indirect evaporative cooling system further includes a float chamber located inside the greywater storage tank. The float chamber is configured to: (a) regulate a level of water in the greywater storage tank, and (b) fluidly connect with each of the greywater storage tank and the greywater drainage system of the ablution bay.

In some embodiments, the greywater drainage system of the ablution bay is fluidly connected to a sewage drain.

In some embodiments, the indirect evaporative cooling system further includes a greywater filtration system. At least one filter is fluidly connected between the greywater storage tank and the evaporative cooler apparatus.

In some embodiments, the indirect evaporative cooling system further includes a treated water storage tank. The treated water storage tank is fluidly connected between the greywater filtration system and the evaporative cooler apparatus. In some embodiments, the treated water storage tank includes a chlorine dispenser.

In some embodiments, the at least one filter of the greywater filtration system is selected from the group consisting of a ceramic filter, an activated carbon filter, and a UV filter.

In some embodiments, the indirect evaporative cooling system further includes a closed alternative water storage tank. The closed alternative water storage tank is fluidly connected to at least one spray nozzle in the evaporative cooler apparatus.

In some embodiments, the indirect evaporative cooling system further includes a water level sensor in the greywater storage tank. If the water level sensor senses that water in the greywater storage tank is below 30%, the closed alternative water storage tank opens.

In some embodiments, a plurality of indirect evaporative cooling systems is configured to operate concurrently for the space to be cooled.

In some embodiments, each of the wet channel and the dry channel of the evaporative cooler apparatus includes a length of 90-150 cm and a width of about 5-15 cm. Further, a gap defined between the wet channel and the dry channel is less than 4 mm.

In some embodiments, the indirect evaporative cooling system operates at an outside air temperature range of about 25° C. to 35° C.; and an outside air humidity range of about 0% to 70%.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
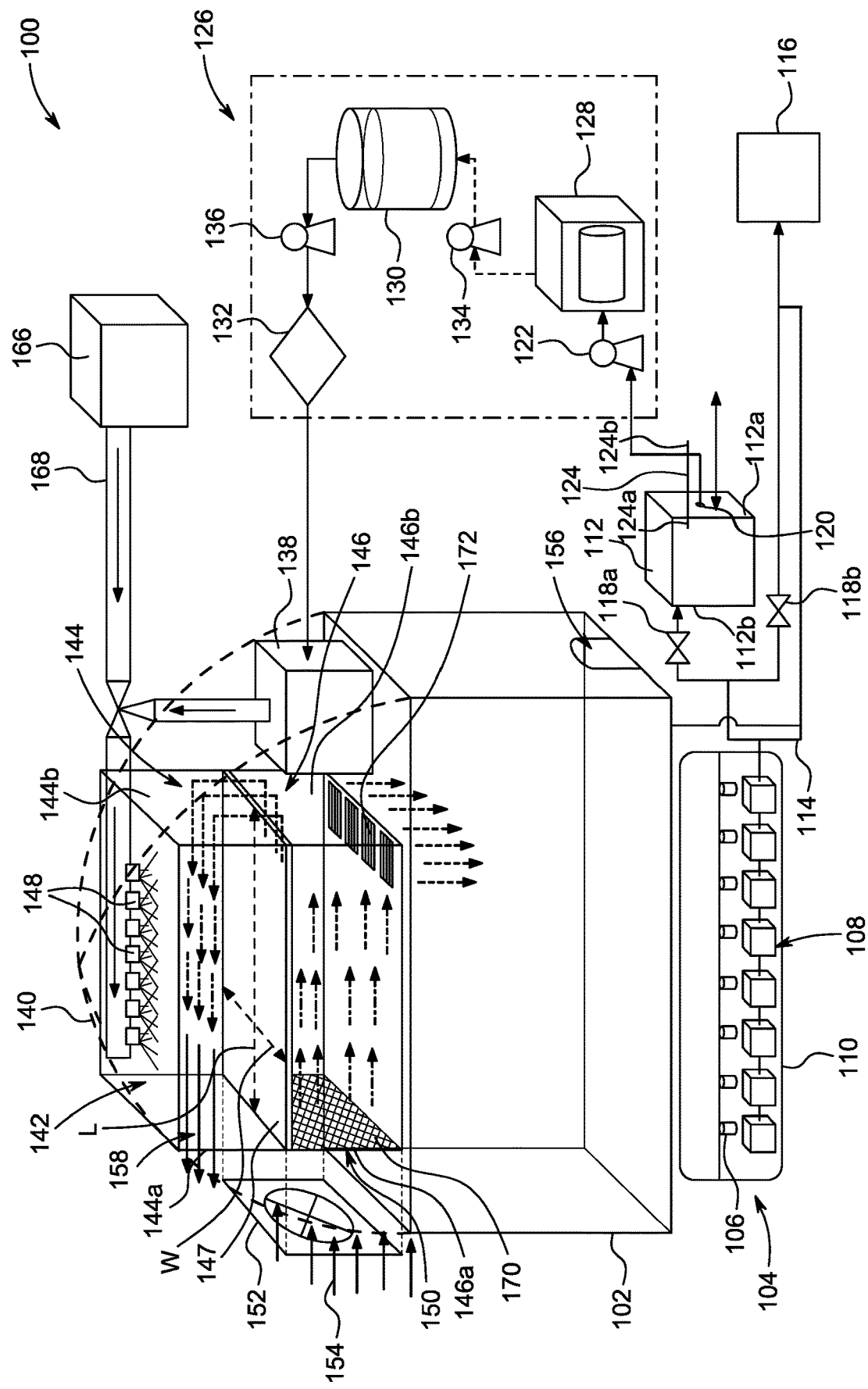
FIG. 1 is a schematic of an indirect evaporative cooling system for cooling a space adjacent or containing an ablution bay, according to an embodiment of the present disclosure.

In the following description, it is understood that other embodiments may be utilized, and structural and operational changes may be made without departure from the scope of the present embodiments disclosed herein.

Reference is made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

As used herein, the terms "optional" or "optionally" means that the subsequently described event(s) can or cannot occur or the subsequently described component(s) may or may not be present (e.g., 0 wt. %). As used herein the words "a" and "an" and the like carry the meaning of "one or more." Furthermore, the terms "approximately," "approximate," "about," and similar terms generally refer to ranges that include the identified value within a margin of 20%, 10%, or preferably 5%, and any values therebetween.

Aspects of this disclosure are directed to an indirect evaporative cooling system for cooling a space adjacent to or containing an ablution bay. Although evaporative cooling systems have remarkable advantages over conventional mechanical vapor compression systems, they are heavily dependent on weather conditions. The wet and dry bulb temperature difference is the driving force in this cooling process. This difference is at its highest value in hot and dry climatic zones. Hence, evaporative cooling systems are very efficient in such geographic regions, such as but not limited to the Middle East and North Africa.

The present disclosure particularly relates to a Maisotsenko cycle (M-cycle) based cooling system which is an indirect evaporative cooling system that uses water as the refrigerant and consumes relatively less electric energy compared to vapor compression cooling systems. In an indirect system, the water does not come into direct contact with the cooled air that is supplied to the space, which is important when using recycled greywater as no contaminants from the greywater will be in the cooled air. The present disclosure describes an integrated greywater treatment and M-cycle evaporative cooling system for cleaner comfort cooling in hot and dry climatic zones. Specifically, the present disclosure focuses on the application of ablution greywater to M-cycle based cooling system for mosque air conditioning, especially as used in dry and hot climates. Although the indirect evaporative cooling system has been described in terms of its implementation specifically for a mosque, it may be appreciated that the teachings of the present disclosure may be utilized for cooling any space adjacent or containing a source of greywater.

Referring to FIG. 1, a schematic of an indirect evaporative cooling system 100 illustrated is, according to an embodiment of the present disclosure. In particular, FIG. 1 illustrates the indirect evaporative cooling system 100 for cooling a space 102 adjacent or containing an ablution bay 104. Hereinafter, the indirect evaporative cooling system 100 is referred by the term "cooling system 100" without any limitations. For the purposes of the present disclosure, as discussed, the cooling system 100 may be implemented for providing cooling comfort to people praying inside a mosque or similar buildings. In such case, the space 102 may be a praying area in the mosque, and the ablution bay 104 may be an area where ritual washing, also known as Wudu, takes place, usually before the prayer. Although in the illustration of FIG. 1, the praying area (i.e., the space 102) is shown separate from the ablution bay 104; traditionally, the praying area (i.e., the space 102) is adjacent to or contains the ablution bay 104. That is, the ablution bay 104 is adjacent to or contained in the space 102 to be cooled. Further, the illustration of the ablution bay 104 is exemplary in nature and should not be construed as limiting.

As illustrated in FIG. 1, the ablution bay 104 includes a plurality of water taps (collectively represented by reference numeral 106 in FIG. 1). In some embodiments, at least one of the water taps of the plurality of water taps 106 includes a manual open/close mechanism. In some embodiments, all of the water taps 106 include a manual open/close mechanism. Generally, water-saving features, such as aerators and motion sensors, are not utilized in such facilities, and hence water runs continuously during ablution practice and is often unattended, which constitutes a source of greywater. Further, the ablution bay 104 includes a greywater drainage system (collectively generally represented by reference numeral 108 in FIG. 1) below (represented by reference numeral 110 in FIG. 1) the plurality of water taps 106. The greywater drainage system 108 collects the greywater from the ablution bay 104, that is used for the purposes of indirect evaporative cooling as per the embodiments of the present disclosure.

The cooling system 100 also includes a greywater storage tank 112. In the illustration of FIG. 1, the greywater storage tank 112 has been shown to be cuboidal in shape. However, it may be appreciated that the illustrated shape is exemplary, and the greywater storage tank 112 may have some other suitable shape, such as cylindrical or the like, without any limitations. As shown, the greywater storage tank 112 has a first side 112a and a second side 112b. In the present embodiment, the greywater storage tank 112 is fluidly connected to the greywater drainage system 108 of the ablution bay 104 through a piping network (generally represented by reference numeral 114 in FIG. 1) at least partially below 110 of the ablution bay 104 and/or the space 102 to be cooled. In particular, the greywater storage tank 112 is connected to the greywater drainage system 108 of the ablution bay 104 on the second side 112b thereof.

Further, as shown in FIG. 1, the greywater drainage system 108 of the ablution bay 104 is connected to a sewage drain (represented by a block 116 in FIG. 1). The greywater drainage system 108 may be connected to the sewage drain 116 via the piping network 114. The sewage drain may allow to drain out excess greywater beyond capacity of the greywater storage tank 112 (i.e., when the greywater storage tank 112 may be fully filled to its capacity with the greywater). That is, once the greywater storage tank 112 is filled and there is still flow of the greywater from the greywater drainage system 108, the extra greywater is directed to the sewage drain 116. As shown, the piping network 114, that establishes connections from the greywater drainage system 108 to the greywater storage tank 112 as well as the sewage drain 116, may include directional valves 118a and 118b (specifically, one-way valve 118a and 118b) to prevent back flow of water therefrom. Further, the valves 118a and 118b may allow regulation of the greywater from the greywater drainage system 108 of the ablution bay 104 to the greywater storage tank 112 and to the sewage drain 116, as required, which may be contemplated by a person skilled in the art.

In some examples, the cooling system 100 further includes a float chamber (not shown) located inside the greywater storage tank 112. The float chamber is a known type of device used for automatically regulating the supply of a liquid to a system. In the present configuration, the float chamber is configured to regulate a level of water in the greywater storage tank 112. The float chamber is further configured to fluidly connect with each of the greywater storage tank 112 and the greywater drainage system 108 of the ablution bay 104.

Also, as shown, the greywater storage tank 112 defines an outlet 120. In an aspect, the outlet 120 may be positioned at a mid-height on the first side 112a of the greywater storage tank 112. In other example embodiments, the outlet 120 may be located at a point other than the mid-height on the first side 112a of the greywater storage tank 112. The greywater storage tank 112 is fluidly connected, via the outlet 120, to a water pump 122 on the first side 112a of the greywater storage tank 112. The water pump 122 is configured to pump out the water from the greywater storage tank 112, to be supplied for the purposes of indirect evaporative cooling as per the embodiments of the present disclosure (described later in the description). In some embodiments, the water pump 122 may be implemented as one of a centrifugal pump or a rotary pump. For example, the water pump 122 may be one of an axial-flow pump, a mixed-flow pump, a single rotor pump or a multi rotor pump. In other examples, the water pump 122 may be a reciprocating pump or a special effect pump as known in the art, without departing from the scope of the present disclosure.

Further, the greywater storage tank 112 includes a plurality of heat pipes (generally represented by a line 124 in FIG. 1). The plurality of heat pipes 124 are attached (such attachment represented by a double-sided arrow in the illustration of FIG. 1) to a wall of the greywater storage tank 112. Specifically, on one end 124a of the heat pipes 124 is attached to the wall (such as the first side 112a and/or the second side 112b; and shown as the first side 112a in the illustration of FIG. 1) of the greywater storage tank 112, where each heat pipe extends perpendicularly outwards with respect to the greywater storage tank 112. Further, in embodiments where the greywater storage tank 112 is implemented as a cylindrical structure, the plurality of heat pipes 124 are equally spaced around the wall of the greywater storage tank 112. In one example, with the greywater storage tank 112 having the cylindrical shape, the plurality of heat pipes 124 may be disposed in arrays of heat pipes radiating outwardly from the wall of the greywater storage tank 112 above the outlet 120. Also, an opposite end 124b of the plurality of heat pipes 124 is exposed to an environment directly outside of the tank. In some embodiments, the environment is outside air.

In some embodiments, each of the plurality of heat pipes 124 includes a copper enclosure (not shown) with a copper sintered wick structure (not shown) extending along a length of the heat pipe 124. In some examples, each of the plurality of heat pipes 124 may further include an evaporator section (not shown) and a condenser section (not shown). In the evaporator section inside of the heat pipe, heat turns an evaporable liquid into vapor which then travels to the condenser section where the vapor turns back to liquid and returns to the evaporator section via the sintered wick structure. This cycle is continuously repeated, thereby one end may be the condenser section or cooling end of the heat pipe and the opposite end may be the evaporator section or heating end, as may be contemplated by a person skilled in the art. In some embodiments, the evaporable liquid inside of the heat pipe may be acetone, methanol, water, or toluene. In an embodiment, if the environment directly outside of the greywater storage tank is hotter than the environment inside the tank, the heat pipes will act to transfer the heat away from the outside environment and into the greywater storage tank, thereby heating the greywater. The increase in greywater temperature may improve the filtration process as discussed later in the description.

Further, as illustrated in FIG. 1, in one or more embodiments, the cooling system 100 includes a greywater filtration system 126. The greywater filtration system 126 is utilized for filtering of the greywater stored in the greywater storage tank 112, before the water is utilized for evaporative cooling process. In some embodiments, the greywater storage tank 112 is fluidly connected to at least one filter (i.e., the greywater filtration system 126) before connecting to the evaporative cooler apparatus 142.

In some embodiments, the greywater filtration system 126 is selected from the group consisting of a ceramic filter, an activated carbon filter, and/or a UV filter. In an example, as shown in FIG. 1, the greywater filtration system 126 includes a ceramic filter 128, an activated carbon filter 130 and a UV filter 132. The function of the ceramic filter 128 is to remove sediment and bacteria from the water. Subsequently, the water passes through the activated carbon filter 130 which provides a second filtration stage in the form of an adsorption column. The purpose of the activated carbon filter 130 is to remove unwanted organic compounds with unpleasant odor, test, and color. The water is then pumped to the UV filter 132, where the treated water is subjected to disinfection to kill bacteria and other micro-organisms in the treated water. In some examples, as illustrated in FIG. 1, the greywater filtration system 126 may employ pumps, including a pump 134 to pump out the water from the ceramic filter 128 to be passed to the activated carbon filter 130 for next stage of filtration, and another pump 136 to further pump out the water from the activated carbon filter 130 to be passed to the UV filter 132 for next stage of filtration.

In some embodiments, the cooling system 100 further includes a treated water storage tank 138. The treated water storage tank 138 is fluidly connected between the greywater filtration system 126, and the evaporative cooler apparatus 142. As such, the treated water storage tank 138 receives the treated water from the greywater filtration system 126 and stores the treated water therein. As illustrated in FIG. 1, the treated water storage tank 138 may be positioned on top of the space 102 to be cooled, such as a rooftop of the mosque. In some examples, the treated water storage tank 138 may have a capacity equal to that of the greywater storage tank 112, so as to store all the water, after treatment by the greywater filtration system 126. In an embodiment, the treated water storage tank 138 includes a chlorine dispenser (not shown). The chlorine dispenser may be configured to dispense a predefined quantity of chlorine to the water stored in the treated water storage tank 138, for further treatment thereof.

Furthermore, as illustrated in FIG. 1, the space 102 to be cooled may include a dome shaped housing (as depicted in broken lines and referenced by numeral 140 in FIG. 1). In particular, the dome shaped housing 140 is located above the space 102 to be cooled. Many mosques feature such dome shaped housing 140. The dome shaped housing 140 is generally in the shape of a hemisphere, however, other similar shapes may be contemplated.

The cooling system 100 further includes an evaporative cooler apparatus 142. There are many different types of evaporative cooling solutions, however, the present disclosure, or particularly the evaporative cooler apparatus 142 focuses on the indirect evaporative cooling based on the Maisotsenko-cycle (M-cycle) based air conditioning systems, which would be known to a person skilled in the art.

As illustrated in FIG. 1, the evaporative cooler apparatus 142 is located above the space 102 to be cooled and within the dome shaped housing 140. A placement of the evaporative cooler apparatus 142 above the space 102 (i.e., the prayer area) provides for better cooling of the space 102. In some examples, as depicted in FIG. 1, the treated water storage tank 138 may also be located inside the dome shaped housing 140.

In some embodiments, the dome shaped housing 140 is coated with an infrared light reflective material (not shown in FIG. 1). Such infrared light reflective material ensures that maximum amount of sunlight impinging on the dome shaped housing 140 is reflected back, thus leading to low absorption of heat by the components, including the evaporative cooler apparatus 142 and the treated water storage tank 138. In one or more embodiments, the infrared light reflective material is selected from the group consisting of an acrylic polymer, asphalt, a polyurethane polymer, and a silicone polymer. It will be understood that the reflective materials listed here are not exhaustive, and other infrared light reflective materials known to a person skilled in the art may be used.

As illustrated in FIG. 1, the evaporative cooler apparatus 142 includes a wet channel 144 and a dry channel 146. As shown, the wet channel 144 is located directly above the dry channel 146. The wet channel 144 and the dry channel 146 may be separated by a partition 147, such as polymer sheet or the like, which allows for heat exchange between the wet channel 144 and the dry channel 146. In one or more embodiments, each of the wet channel 144 and the dry channel 146 has a length 'L' in a range of about 90 cm to about 150 cm, preferably 100-140 cm, or 120-130 cm and a width 'W' in a range of about 5 cm to about 15 cm, preferably 7-13 cm, or 9-12 cm. In an example, the wet channel 144 and the dry channel 146 may have the length 'L' in a range of 80 cm to about 160 cm, or 70 cm to about 170 cm; and the width 'W' in a range of 4 cm to about 16 cm, or 3 cm to about 17 cm. Further, a gap (not shown) defined between the wet channel 144 and the dry channel 146 is less than 4 mm, preferably 1-3.5 mm, or 2-3 mm. In an example, the gap between the wet channel 144 and the dry channel 146 is less than 3 mm, or even 2 mm.

Further, the evaporative cooler apparatus 142 includes at least one spray nozzle 148. In general, the evaporative cooler apparatus 142 has multiple nozzles 148. The spray nozzles 148 is located at the top of the evaporative cooler apparatus 142 and is fluidly connected to the water pump 122. The spray nozzles 148 are configured to receive the treated and/or untreated greywater, to spray the water in the evaporative cooler apparatus 142. Further, the spray nozzles 148 are connected to the wet channel 144. Specifically, the nozzles 148 may be disposed inside the wet channel 144 and may be configured to spray the treated water in the wet channel 144.

As illustrated, the wet channel 144 has a first side 144*a* and a second side 144*b*. Similarly, the dry channel 146 has a first side 146*a* and a second side 146*b*. The first side 146*a* of the dry channel 146 is connected to a first opening 150 with a fan 152 and outside air (as represented by reference numeral 154 in FIG. 1). In the illustrated structure of the mosque, the first opening 150 is located on a back side (not labelled) of the dome shaped housing 140 facing the opposite direction of an entrance (as represented by reference numeral 156) to the space 102 to be cooled, i.e., the entrance 156 to the mosque. That is, the fan 152 is disposed at a back side of the mosque. In the present embodiment, the first opening 150 may be defined in the dome shaped housing 140, and the fan 152 may be supported at walls of the dome shaped housing 140.

Further, as illustrated, the wet channel 144 defines a first opening 158 to outside air. In particular, the first opening 158 is defined on the first side 144*a* of the wet channel 144. Similar to the first opening 150, the first opening 158 is located on the back side of the dome shaped housing 140, which is facing the opposite direction of the entrance 156 to the space 102 to be cooled, i.e., the entrance 156 to the mosque. In some embodiments, the cooling system 100 includes a condenser (not shown). A first end of the condenser is connected to the first opening 158 of the wet channel 144 of the evaporative cooler apparatus 142. Further, a second end of the condenser is fluidly connected to at least one spray nozzle 148 located at the top of the evaporative cooler apparatus 142. Thereby, the condenser may be configured to take in the humid air released from the wet channel and recycle the water to be used again in the wet channel, as would be contemplated by a person skilled in the art. In some embodiments, the cooling system 100 includes at least one louver (represented by reference numeral 170 in FIG. 1) covering at least one of the first opening 150 and the first opening 158 on the back side of the dome shaped housing 140. In the exemplary illustration of FIG. 1, the louver 170 is only shown to be covering the first opening 150 of the dry channel 146 of the evaporative cooler apparatus 142. The louver 170 prevents entry of foreign objects, such as birds, inside the evaporative cooler apparatus 142.

In general, with the indirect evaporative cooling, there are two opposing airstreams that contact a different side of a heat exchanger. The outer wall of the heat exchanger contacts air that needs to be conditioned before it is delivered to the space 102. The inner wall is in contact with air that comes from the ambient environment or building exhaust. Indirect evaporative cooling occurs when water sprayed to the interior wall of a heat exchanger evaporates. When the water evaporates, the heat of vaporization imparts a cooling effect to the outer wall of the heat exchanger. This allows the airstream which contacts the outer wall to be sensibly cooled. In the example of FIG. 1, the outside air 154 suctioned into the dry channel 146 is cooled by the heat exchange by an air stream in the wet channel 144 (cooled by sprayed water by the spray nozzles 148). In particular, the evaporative cooler apparatus 142 operates in a controlled manner. In the cooling side of the system (M-cycle), the hot intake air flows along the dry channel 146 losing its sensible heat to the wet channel 144. A portion of the cold air is directed to the wet channel 144 where heat and mass transfer phenomena occur, and eventually, the working air is exhausted as saturated air. Further, in the cooling system 100, the cooled air from the dry channel 146 is passed to the space 102 to be cooled, via openings 172 as shown in FIG. 1.

In some embodiments, the indirect evaporative cooling system 100 further includes a closed alternative water storage tank 166. The closed alternative water storage tank 166 acts as a backup water storage tank to supply water to the evaporative cooler apparatus 142 in case the water in the treated water storage tank 138 and/or the greywater storage tank 112 is exhausted. In some embodiments, the cooling system 100 may include a water level sensor (not shown) in the greywater storage tank 112 (and/or the treated water storage tank 138). If the water level sensor senses that water in the greywater storage tank 112 (and/or the treated water storage tank 138) is below 30%, the closed alternative water storage tank 166 opens, to supply water to the evaporative cooler apparatus 142. In other examples, the closed alternative water storage tank 166 opens when the water in the greywater storage tank 112 (and/or the treated water storage tank 138) is below 20% or 10%. Further, as shown in FIG. 1, the top of the evaporative cooler apparatus is fluidly connected, at one end 168 thereof, to the closed alternative water storage tank 166.

As per embodiments of the present disclosure, the indirect evaporative cooling system 100 operates at: an outside air temperature range of about 25° C. to about 60° C., preferably 28-40° C., or 30-35° C.; and an outside air humidity range of about 0% to about 70%, preferably 30-60% or 40-50%. In some embodiments, a plurality of indirect evaporative cooling systems 100 is configured to operate in tandem to cool the space 102.

EXAMPLES

Figure 2A:
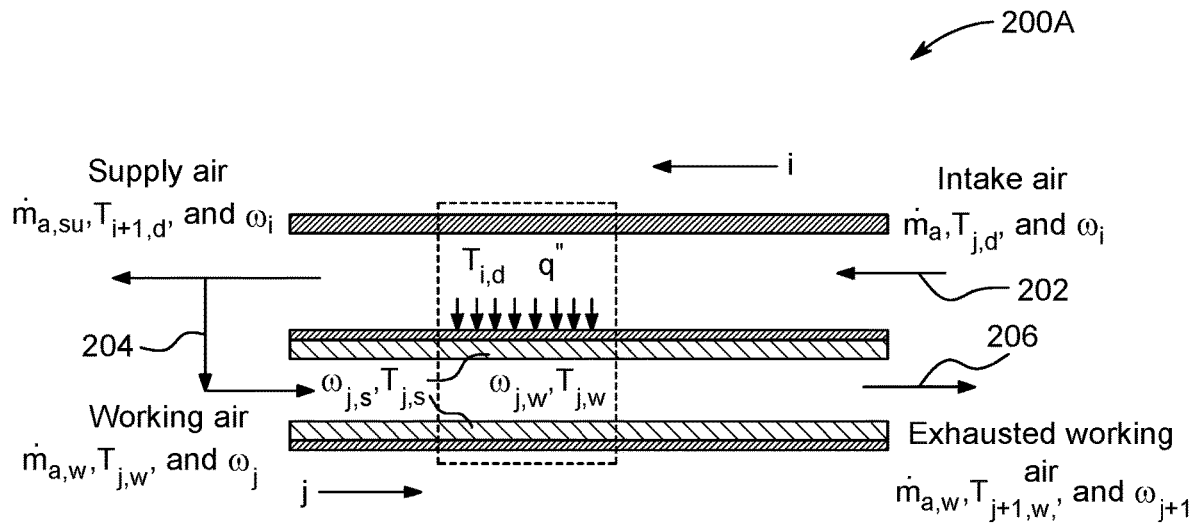
FIG. 2A is a schematic of an Maisotsenko cycle (M-cycle) based cooling system depicting principle of operation thereof, according to aspects of the present disclosure.
Figure 2B:
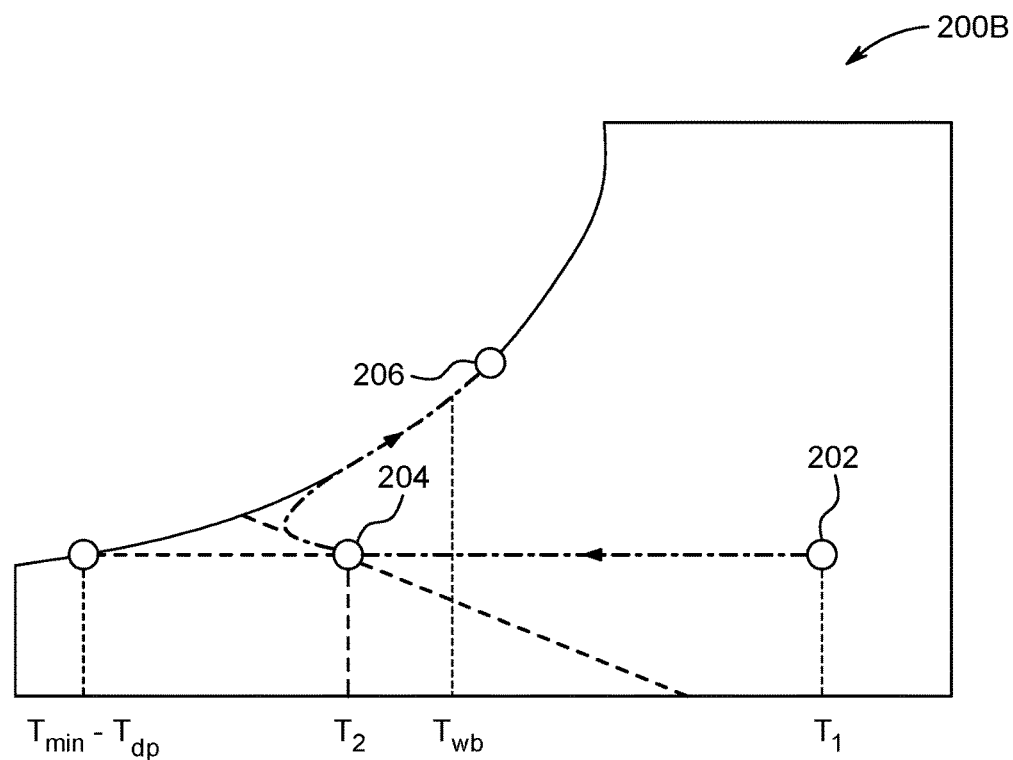
FIG. 2B is a psychometric graph for the M-cycle based cooling system, according to aspects of the present disclosure.

Referring to FIG. 2A and FIG. 2B, an operation of an M-cycle based cooling system is depicted. In particular, FIG. 2A is a schematic of a Maisotsenko cycle (M-cycle) based cooling system 200A depicting principle of operation thereof, and FIG. 2B is a psychometric graph 200B for the M-cycle based cooling system 200A. As illustrated, in an operation of the M-cycle based cooling system 200A, ambient air flowing in the dry channel (such as, the dry channel 146) loses its sensible heat in the wet channel (such as, the wet channel 144) at a first state 202. The air at a second state 204 is cooled until the temperature reaches a value closer to its dew point temperature without changing its humidity, and it is split into working air stream and supplied air stream. The supplied air stream is used for cooling purposes. Heat and mass transfer occurs during evaporation of some of the water sprayed into the working air stream injected into the wet channel 144. Typically, the temperature of the working air stream exiting at a third state 206 may be closer to the intake temperature, and a relative humidity of the air may be closer to 100%.

It will be appreciated that simultaneous steady-state energy and continuity equations govern the flow in the heat exchanger. FIGS. 2A and 2B show the differential control volume used for deriving the conservation equations. The following assumptions were made based on previous studies describing similar systems to develop the model: (1) flow is steady and incompressible, and there is no internal heat generation in the channels; (2) the system is well insulated, and hence, heat transfer between the device and the surrounding space does not take place; (3) channel height is negligible compared to the width of the channel. Thus, the system can be assumed to be one-dimensional, which allows the temperature changes normal to the flow to be considered negligible; (4) viscous dissipation and body forces are negligible; (5) the flow inside the channels is laminar and fully developed; (6) the mass flow rate in each channel is constant; (7) the specific heat of water vapor and dry air does not vary appreciably and is constant; (8) the coefficients of heat and mass transfer do not vary appreciably and are constant; (9) the temperature of the wall and the water film are similar and thus are equal; and (10) the humid air in the wet channel is treated as an ideal incompressible gas mixture.

Figure 3:
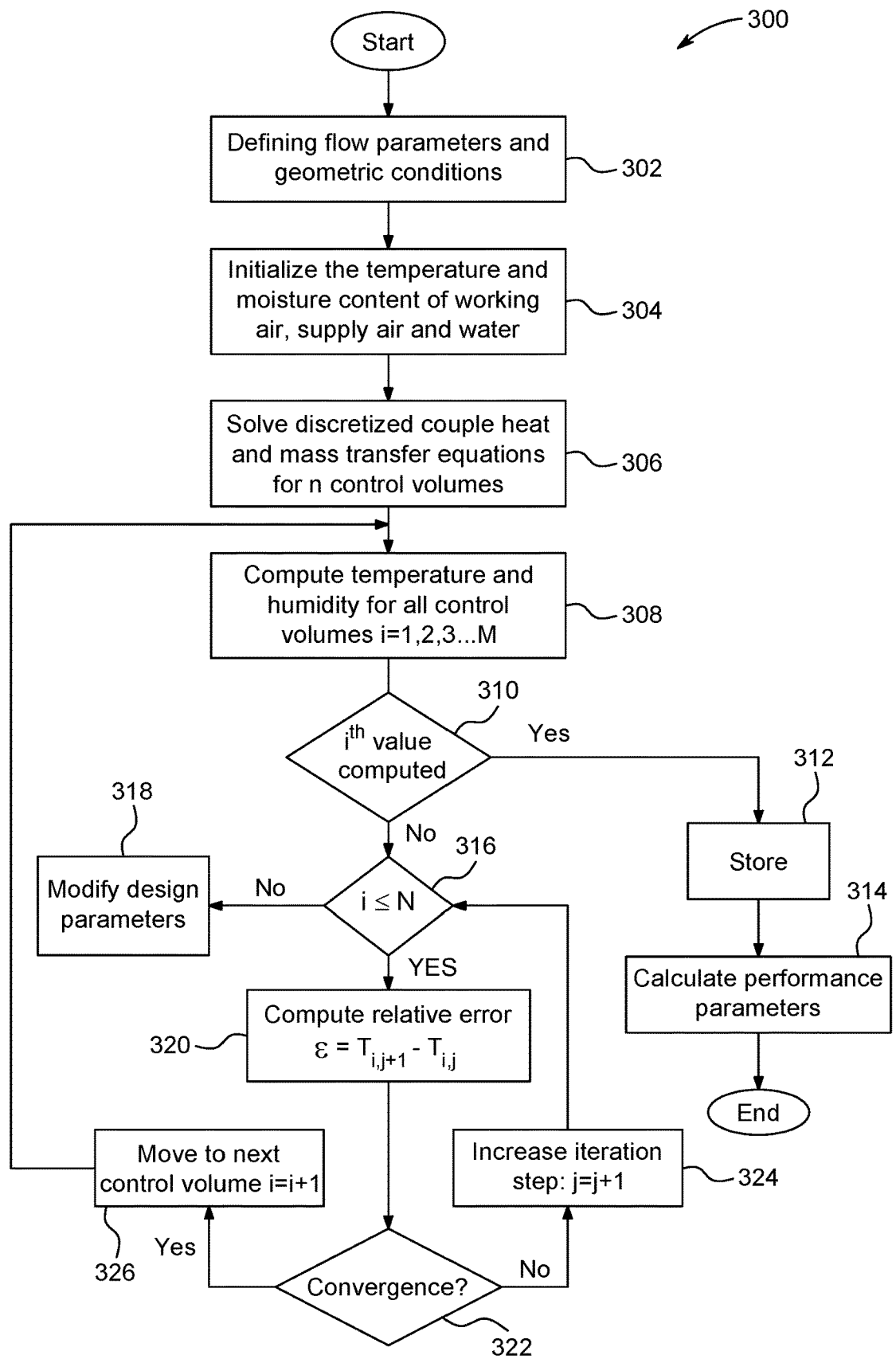
FIG. 3 is a flowchart of a computation methodology for modeling the M-cycle based cooling system, according to aspects of the present disclosure.

FIG. 3 is a flowchart 300 of computation methodology for modeling the M-cycle based cooling system (such as 200A), according to aspects of the present disclosure. In this method 300, at step 302, flow parameters and geometric conditions are defined. At step 304, the temperature and moisture content of the working air steam, the supply air stream and water are initialized. At step 306, discretized couple heat and mass transfer equations for n control volumes are solved. At step 308, temperature, and humidity for all control volumes i=1, 2, 3 ... M are computed. At step 310, it is determined whether the $i^{th}$ value is computed. If YES, at step 312, the value is stored. Further, at step 314, performance parameters are calculated. Subsequently, the process 300 ends. If the $i^{th}$ value is not computed, at step 316, it is determined whether i≤N. If NO, at step 318, the design parameters are modified. If YES, at step 320, a relative error is computed as E Ti,j+1−Ti,j. Further, at step 322, it is checked whether the value is converging. If NO, at step 324, the iteration step is increased, and the method 300 moves back to the step 316. If YES, at step 326, the method 300 moves to the next control volume, and moves back to the step 308.

Given the stated assumptions, conservation of energy equation in the dry channel along the x-direction for the control volume shown in FIGS. 2A and 2B can be written as indicated in Equation (1).

$$-\dot{m}_d c_d \frac{dT_d}{dx} = UW(T_{wf} - T_d) \tag{1}$$

where, U is an overall dry channel heat transfer coefficient, which can be calculated using Equation (2) and ca is the specific heat of dry air.

$$U = \left(\frac{1}{h_d} + \frac{t_{plate}}{k_{plate}} + \frac{t_{paper}}{k_{paper}}\right)^{-1} \tag{2}$$

where, $h_d$ is the dry channel convective heat transfer coefficient, $k_{plate}$ is the thermal conductivity of the plastic plate and $k_{paper}$ is the thermal conductivity of the wicking paper.

Similarly, the conservation of energy equation applicable to the wet channel is given by Equation (3).

$$\dot{m}_w c_w \frac{dT_w}{dx} = h_w W(T_{wf} - T_w) \tag{3}$$

where, $c_w$ is the water vapor specific heat, and $h_w$ is the heat transfer coefficient in the wet channel.

Likewise, the conservation of mass for the differential control volume in the wet channel can be expressed by Equation (4).

$$\dot{m}_w \frac{dT_w}{dx} = h_w W(w_{wf} - w_w) \tag{4}$$

where, $h_m$ is the wet channel mass transfer coefficient.

Furthermore, the conservation of energy near the wall between the wet and dry channels is given by Equation (5).

$$h_w W(T_w - T_{wf}) + h_d W(T_d - T_{wf}) + \\ H_{wfg} h_m W(w_{wf} - w_w) + k_{plate} WL \frac{d^2 T_{wf}}{dx^2} = 0 \tag{5}$$

where, $H_{wfg}$ is the latent heat of water and $h_m$ is the mass transfer coefficient.

Moreover, the Antoine equation [Equation (6)] is used to calculate the dew point temperature of the ambient air at a given pressure.

$$T_{dew}(K) = \frac{3984.92}{16.5699 - \ln(p(kpa))} + 39.724 \tag{6}$$

Furthermore, Equation (7) is used to calculate the wet bulb temperature of the air.

$$T_{wet}(°C.) = 2.265 \sqrt{1.97 + 4.3T(°C.) + \omega 10^4} - 14.84 \tag{7}$$

The performance of the M-cycle based cooling system can be estimated using the dew point effectiveness which is estimated by dividing the temperature difference along the dry side by the difference in the dew point temperature of the inlet dry bulb and the inlet as expressed by Equation (8).

$$e_{wb} = \frac{T_1 - T_2}{T_1 - T_{1,wb}} \tag{8}$$

where, $\varepsilon_{wb}$ is wet-bulb effectiveness, $T_{1,wb}$ is the wet-bulb temperature at the inlet of the dry channel, and $T_1$ and $T_2$ which are the inlet and supply temperatures of the dry channel, respectively.

Moreover, the evaporative cooling performance may also be obtained using the expression in Equation (9).

$$e_{dp} = \frac{T_1 - T_2}{T_1 - T_{1,dp}} \tag{9}$$

where, $\varepsilon_{dp}$ is the dewpoint effectiveness, $T_{1,dp}$ is the dew point temperature at the inlet of the dry channel, and $T_1$ and $T_2$ are the inlet and supply temperatures of the dry channel respectively.

Further, the coefficient of performance (COP) of the system may be defined by Equation (10).

$$COP = \frac{Q_{cooling}}{W} \tag{10}$$

where, $Q_{cooling}$ is the cooling capacity of the system and is expressed by Equation (11).

$$Q_{cooling} = m_{d,su} c_d (T_{d,2} - T_{d,1}) \tag{11}$$

where, $m_{d,su}$ is the mass flow rate of supplied air. The energy utilized by the cooling system (W) is defined by Equation (3) to (12) which is the sum of the energy consumed by the board, pump, fan, thermostat, and the solenoid provides the electrical energy consumed by the cooling system. As the energy consumed by the board, pump, thermostat, solenoid, and soap is about 5% of the energy consumed by the fan, they may be neglected. The electric energy consumption of the fan is expressed by Equation (12).

$$W_{fan} = W_{fan,base} \left(\frac{\rho}{\rho_{base}}\right) \left(\frac{\dot{V}}{\dot{V}_{base}}\right) \left(\frac{SH}{SH_{base}}\right) \tag{12}$$

where, $\dot{V}$ is the volumetric flow rate through the fan, $\rho$ is the air density, and SH is the static head of the fan. As the air density does not change significantly, density ratio in Equation (12) is almost unity.

Static head of the fan can be expressed by Equation (13).

$$SH = f \times \Delta P \tag{13}$$

where, f is a safety factor for both the base case and the operating case. Hence, the energy consumed by the fan may be expressed by Equation (14).

$$W_{fan} = W_{fan,base} \left(\frac{\dot{V}}{\dot{V}_{base}}\right) \left(\frac{\Delta P}{\Delta P_{base}}\right) \tag{14}$$

In addition, the total pressure drop through the system is expressed by Equation (15).

$$\Delta P = \Delta Pw + \Delta Pd \tag{15}$$

where, $\Delta P_d$ is the pressure drop through the dry channel and $\Delta P_w$ is the pressure drop through the wet channel. They are defined by Equation (16) and Equation (17), as below.

$$\Delta P_w = 1.12 \rho_a V^2 + 0.125 \rho_a V^2 \tag{16}$$

$$\Delta P_d = 1.12 \rho_a V^2 + 0.04 \rho_a V^2 \tag{17}$$

Finally, water consumption per kWh of cooling capacity can be expressed by Equation (18).

$$WC\left(\frac{m^3}{Kwh}\right) = 3600 \frac{\dot{m}_w(\omega_1 - \omega_3)}{\rho_w Q_{cooling}} \tag{18}$$

where, $\rho_w$ is the water density.

In the above equations, subscripts 'd' and 'w' refer to the dry and wet channels, while 'wf' refers to the water film. The width and length of the channels are designated as W and L, respectively. Thus, the equations 1, 2, 3, 4, and 5 describe the heat and mass transfer of the system under the stated assumptions.

Further, for transport coefficients, convective heat transfer coefficients are described by Equation (19) corresponding to for the dry and wet channels.

$$h = \frac{Nu k_{air}}{d_h} \quad (19)$$

where, $k_{air}$ is the thermal conductivity of air, Nu is the Nusselt number, and $d_h$ is the hydraulic diameter of the channel, defined by Equation (20):

$$d_h = \frac{4 * \text{cross sectional area}}{\text{perimeter}} \quad (20)$$

Approximate values of the Nusselt number may be obtained for the dry and wet channels to determine the heat transfer coefficient. The flow through the rectangular flutes in the dry channel may be assumed to be laminar, while the heat transfer occurs through only the wall to which the wicking paper is attached. The Nusselt number for fully developed laminar flow between two infinite plates with one wall experiencing heat transfer, is Nud=8.14. The dry channel convective heat transfer coefficient is then defined by Equation (21).

$$h_d = \frac{Nu_d k_{air}}{d_{h,d}} \quad (21)$$

where, $Nu_d$ is the Nusselt number in the dry channel and $d_h$ is the hydraulic diameter of the dry channel.

Air flows between parallel plates in the wet channel, where heat transfer is through one wall. The Nusselt number for fully developed laminar flow between parallel plates with one wall experiencing heat transfer, is $Nu_w$=5.385. Heat and mass transfer analogy can be used to determine the mass transfer coefficient in the wet channel. Accordingly, the heat and mass transfer relationships of a specific surface shape are interchangeable making $Nu_w$=$Sh_w$, where $Sh_w$ is the Sherwood number, which represents the dimensionless mass transfer coefficient. Therefore, the heat and mass transfer coefficients in the wet channel can be expressed by Equation (22) and (23), respectively.

$$h_w = \frac{Nu_w k_{air}}{d_{h,w}} \quad (22)$$

$$h_m = \frac{Sh_d \rho_{air} D_{va}}{d_{h,w}} \quad (23)$$

where, $D_{va}$ is the binary diffusion coefficient of water vapor in air.

For boundary conditions, Equation (24) and Equation (25) provide the air temperature and humidity ratio at the inlet of the dry channel (x=L), respectively.

$$T_d = T_{in} \text{ at } x = L \quad (24)$$

$$\omega_d = \omega_{in} \text{ at } x = L \quad (25)$$

Since the wet channel inlet is at the outlet of the dry channel (x=0) and a portion of the air in the dry channel is fed into the wet channel, the temperature and humidity ratio are assumed to be equal at this point, as provided by Equation (26) and Equation (27).

$$T_w = T_d \text{ at } x = 0 \quad (26)$$

$$\omega_w = \omega_d \text{ at } x = 0 \quad (27)$$

As the plastic plate dividing the dry and wet channels is expected to be insulated at the inlet and outlet of the cooling system (x=0 and x=L), the temperature gradient at the inlet and outlet is assumed to be zero and are expressed by Equation (28) and Equation (29), respectively.

$$\frac{dT_{wf}}{dx} = 0 \text{ at } x = 0 \quad (28)$$

$$\frac{dT_{wf}}{dx} = 0 \text{ at } x = L \quad (29)$$

Equations 26 to 29 are the boundary conditions of the cooling system.

For discretized model, the first and second derivatives are approximated using backward and centered finite divided difference formulas, respectively, to numerically solve the governing differential equations of the cooling system (equations 1, 2, 3, 4, and 5). The finite difference formulas used are expressed by Equation (30) and Equation (31)

$$f'(x_i) = \frac{f'(x_i) - f(x_{i-1})}{h} \quad (30)$$

$$f''(x_i) = \frac{f'(x_{i+1}) - 2f(x_i) + f(x_{i-1})}{h^2} \quad (31)$$

where, h is the step size.

Figure 4:
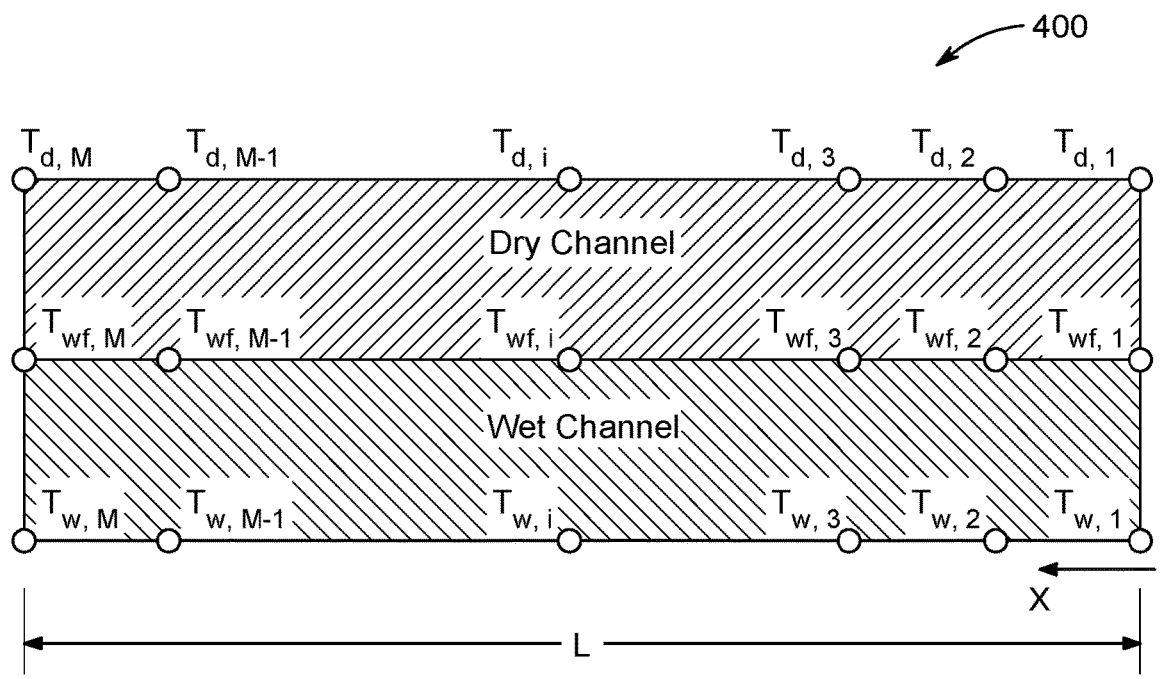
FIG. 4 is a representation of computation of parameters for a pair of dry and wet channels in the M-cycle based cooling system, according to aspects of the present disclosure.

The computational domain of a combination of dry and wet channels is depicted in FIG. 4, which provides for computation of parameters for a pair of dry and wet channels (represented by reference numeral 400) in the M-cycle based cooling system. Nodes, which represent the positions at which the temperature is calculated, are positioned throughout the computational domain to obtain the numerical model. As shown in FIG. 4, the position of any node i along x is given by Equation (32).

$$x_i = \frac{(i-1)L}{M-1} \quad (32)$$

where, M is the number of nodes used in the x direction. The distance between adjacent nodes is expressed by Equation (33).

$$\Delta x = \frac{L}{M-1} \quad (33)$$

Using the above equations, the finite difference version of the governing equations, i.e., the numerical model, is obtained as follows:

Energy balance in the dry channel is defined by Equation (34).

$$-m_d c_d \frac{T_{d,i} - T_{d,i-1}}{\Delta x} = UW(T_{wf,i} - T_{d,i}) \quad (34)$$

Energy balance in the wet channel is defined by Equation (35).

$$\dot{m}_w c_w \frac{T_{w,i} - T_{w,i-1}}{\Delta x} = h_w W(T_{wf,i} - T_{w,i}) \quad (35)$$

Equation (36) describe the conservation of mass in the wet channel.

$$\dot{m}_w \frac{\omega_{w,i} - \omega_{w,i-1}}{\Delta x} = h_w W(\omega_{wf,i} - \omega_{w,i}) \quad (36)$$

Energy balance of the wall is defined by Equation (37).

$$h_w W(T_{w,i} - T_{wf,i}) + h_d W(T_{d,i} - T_{wf,i}) + \quad (37)$$
$$H_{w,fg,i} h_m W(\omega_{w,i} - \omega_{wf,i}) + k_{plate} WL \frac{T_{wf,i+1} - 2T_{wf,i} + T_{wf,i-1}}{\Delta x^2} = 0$$

Numerical Solution Method

Figure 5:
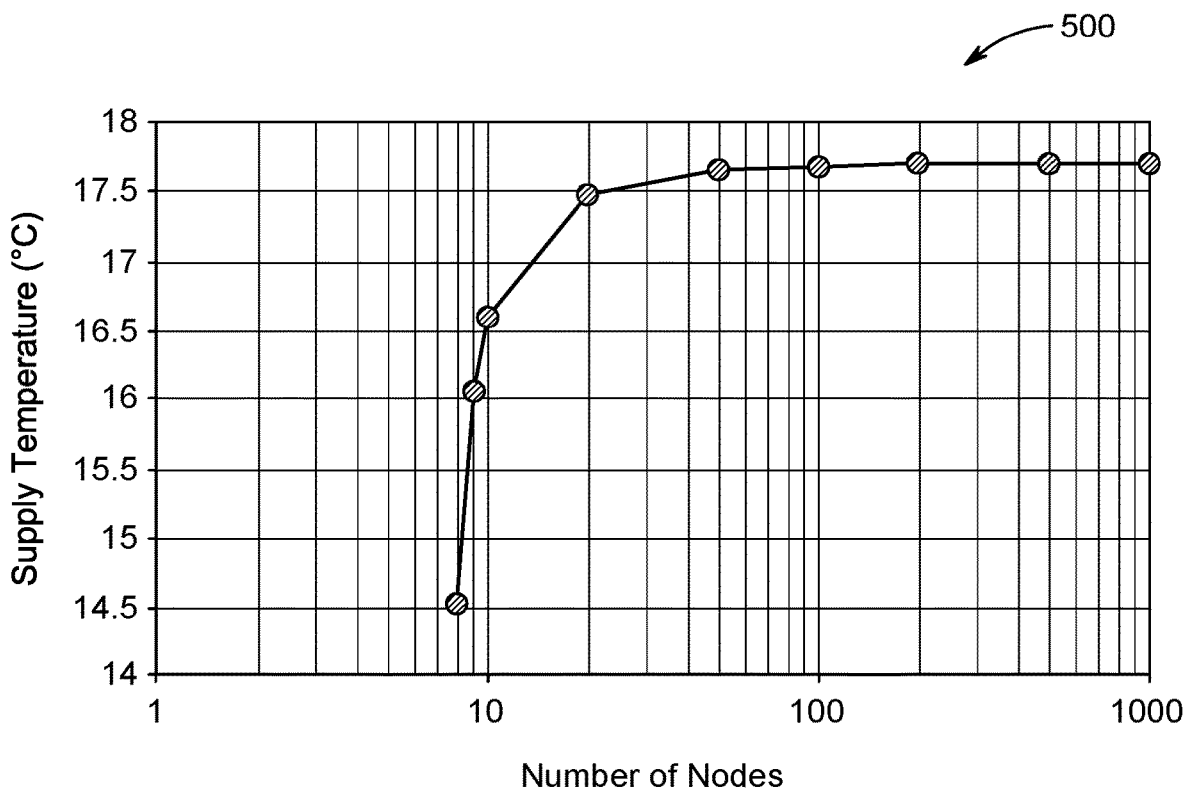
FIG. 5 is a graphical representation of supply temperature as a function of a number of nodes in the M-cycle based cooling system, according to aspects of the present disclosure.

The present disclosure further provides a numerical solution method. The finite difference equations (Equations 34 to 37) derived from the differential equations of the mass and energy balances of the heat exchanger are implemented in the Engineering Equation Solver (EES) framework. As it contains several built-in libraries comprising thermodynamic and thermo-physical properties, EES is a powerful tool for solving engineering problems, particularly thermodynamic and heat transfer problems. All the air, water, and water vapor properties are calculated using the internal functions in the EES software. Systems of equations are solved using a variation of Newton's method by EES. The process begins in this method with a value guessed for each variable. These values are then iteratively refined until the set of equations are satisfied with a relative residual of 10-6. An important aspect is to choose an appropriate number of nodes to ensure that the numerical solution has sufficient accuracy. The general approach for choosing the number of nodes is to select a key aspect of the solution and examine its behavior as the number of nodes in the computational domain is increased. The selected aspect of the solution, in this case, is the supply temperature of the dry channel. A graph 500 of the supply temperature as a function of the number of nodes is shown in FIG. 5. The graph 500 indicates that the solution has converged after about 100 nodes.

Further, the distribution of the temperature and humidity inside the dry and wet channels of the heat exchanger and the supply temperature and humidity are calculated by solving the systems equations. The dimensions of the heat exchanger followed by the reference operating conditions are presented in Table 2 and Table 3 below.

TABLE 2

Heat exchanger specifications

| Parameter | Symbol | Value (mm) |
| --- | --- | --- |
| Dry Channel Spacing | $y_{dry}$ | 3 |
| Wet Channel Spacing | $y_{wet}$ | 3 |
| Channel length | L | 1200 |
| Channel width | W | 80 |
| Plate thickness | $t_{plate}$ | 0.2 |
| Paper thickness | $t_{paper}$ | 0.15 |

TABLE 3

Reference operating conditions

| Parameter | Symbol | Value (mm) |
| --- | --- | --- |
| Inlet air temperature | $T_{inlet}$(C) | 25 |
| Inlet humidity ratio | $\omega_{inlet}$ (kg/kg) | 0.0069 |
| Inlet air mass flow rate | $\dot{m}_d$(kg/s) | 0.0006912 |
| Working air to Supply air ratio | $\frac{\dot{m}_w}{\dot{m}_d}$ | 0.33 |

Figure 6:
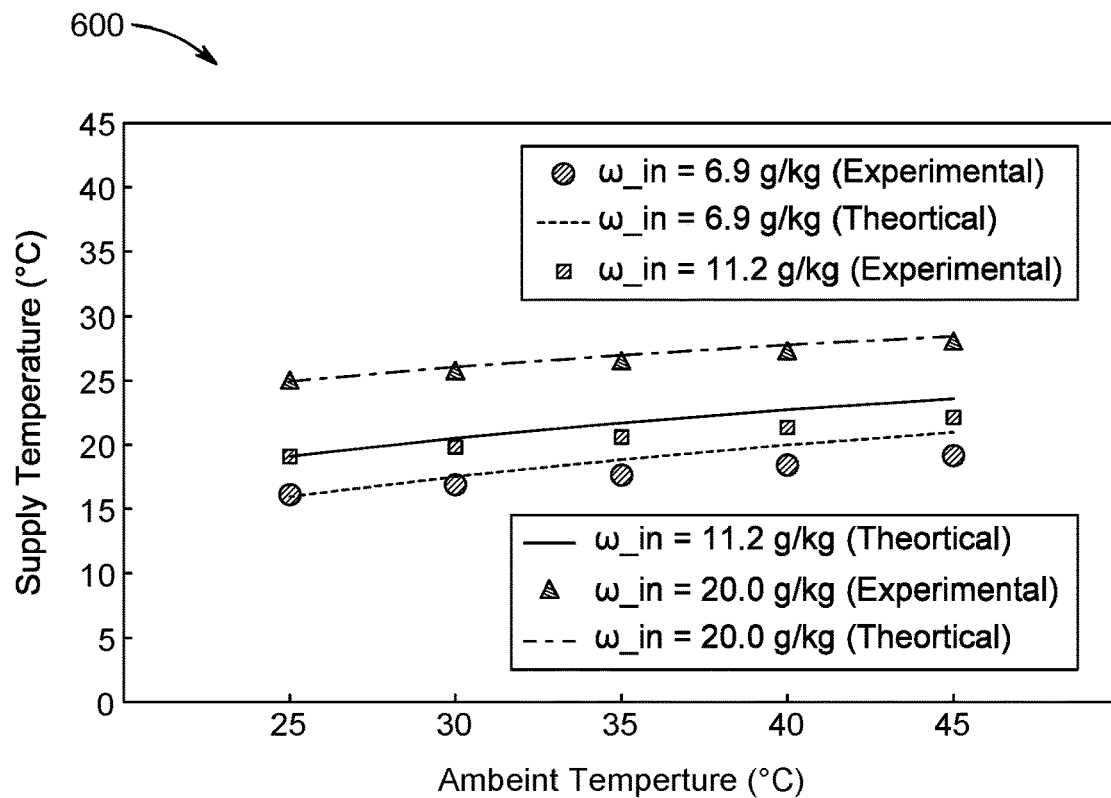
FIG. 6 is a graphical representation of comparison between experimental results and predictions as per utilized data for the present disclosure.

Validation:

M-cycle air cooling systems are evaluated using three main methods, namely, numerical simulation, statistical design, and analytical solution methods. However, the most common evaluation method is the numerical simulation. EES software is used to solve the developed mathematical code for the dew point cooling system. The results are compared with experimental data from literature determined at the same operating conditions and heat exchanger dimensions obtained from the literature. The difference between predicted and measured outlet temperatures is 0.04° C. to 0.77° C., which represents a 3 to 5% relative difference. Several computer programs have been developed to describe the mass and heat transfer phenomena in this novel cycle with an average error of 8% to 10%. However, as illustrated in a graph 600 of FIG. 6, the overall error of predictions made using the model proposed in this study is 3.3%. Even though the results predicted by the model match the trend of the experimental results, the predicted supplied temperatures are lower than the experimental results published in the literature. The higher supplied temperatures obtained in experiments compared to the model predictions can be due to several factors, including but not limited to the non-uniform airflow and uneven water distribution in the wet channel.

The results of mathematical modeling are presented and discussed here in detail. The presentation of the results begins with a discussion of the weather data of Riyadh city, which has a significant effect on the performance of the proposed system, followed by a description of the study of the performance of the system for Riyadh climatic conditions. Finally, the performance of the heat and mass exchanger of the dew point evaporative cooling system under a range of climate conditions, channel geometries, and operational conditions are examined.

In this study, Riyadh was selected to examine the feasibility of using an M-cycle-based cooling system. Riyadh is the capital of the Kingdom of Saudi Arabia, which is characterized by higher energy consumption due to its high population. The highest electricity demand is in May, June, July, August, and September in Riyadh. The overall performance of evaporative cooling systems depends largely on the weather conditions (air temperature and relative humidity). Hence, Riyadh weather for the whole year is studied thoroughly to gauge the potential of using such a system for cooling purposes. The weather data were obtained using the EnergyPlus Program of the Department of Energy. EnergyPlus Program provides the hourly weather data, including the barometric pressure, dry bulb temperature, and dew point temperature. The hourly data are used to calculate the average monthly data. Table 4 shows the monthly relative humidity and dry bulb temperature for Riyadh. In the summer season, the average temperature in Riyadh is well above the comfortable level, except sometimes in September. However, the climate in Riyadh is characterized by low relative humidity. Diurnal variations indicate that the temperature increases from 6:00 a.m., reaching a maximum at noon and subsequently decreasing, unlike the variations of relative humidity. The data in Table 4, indicate that the minimum average recorded temperature is 9° C., and the maximum is 43° C. As shown in Table 4, the maximum relative humidity of 68% in Riyadh meets the criterion required for the successful operation of an M-cycle-based cooling system. Furthermore, during the summer season, the relative humidity is very low and well below the critical value.

TABLE 4

Dry bulb temperature and relative humidity for Riyadh city.

| | Temperature (° C.) | | | Relative Humidity (%) | | |
|---|---|---|---|---|---|---|
| Month | Maximum | Maximum | Average | Maximum | Maximum | Average |
| January | 9 | 20.2 | 14.6 | 28 | 66 | 47 |
| February | 11.2 | 23.4 | 17.3 | 7 | 65 | 36 |
| March | 15.2 | 27.7 | 21.45 | 7 | 57 | 32 |
| April | 20.4 | 33.4 | 26.9 | 7 | 49 | 28 |
| May | 25.9 | 39.4 | 32.65 | 6 | 28 | 17 |
| June | 28 | 42.5 | 35.25 | 5 | 17 | 11 |
| July | 29.3 | 43.5 | 36.4 | 5 | 15 | 10 |
| August | 29.2 | 43.6 | 36.4 | 6 | 18 | 12 |
| September | 25.9 | 40.4 | 33.15 | 4 | 24 | 14 |
| October | 21.2 | 35.3 | 28.25 | 9 | 31 | 20 |
| November | 15.5 | 27.8 | 21.65 | 14 | 58 | 36 |
| December | 10.6 | 22.2 | 16.4 | 26 | 68 | 47 |

The performance of M-cycle-based cooling system for the climatic conditions existing in Riyadh city was assessed in this section. The geometric dimensions of the proposed system are a channel length of 120 cm, channel width of 8.0 cm, and a gap of 3 mm, while the operating conditions are an air velocity of 2.4 m/s and an exhausted-air-to-intake-air ratio of 33%. The results are expressed in terms of the average monthly variation of the temperature of the supplied air, relative humidity of the supplied air, cooling effectiveness, cooling capacity, power, COP, and water consumption.

Figure 7:
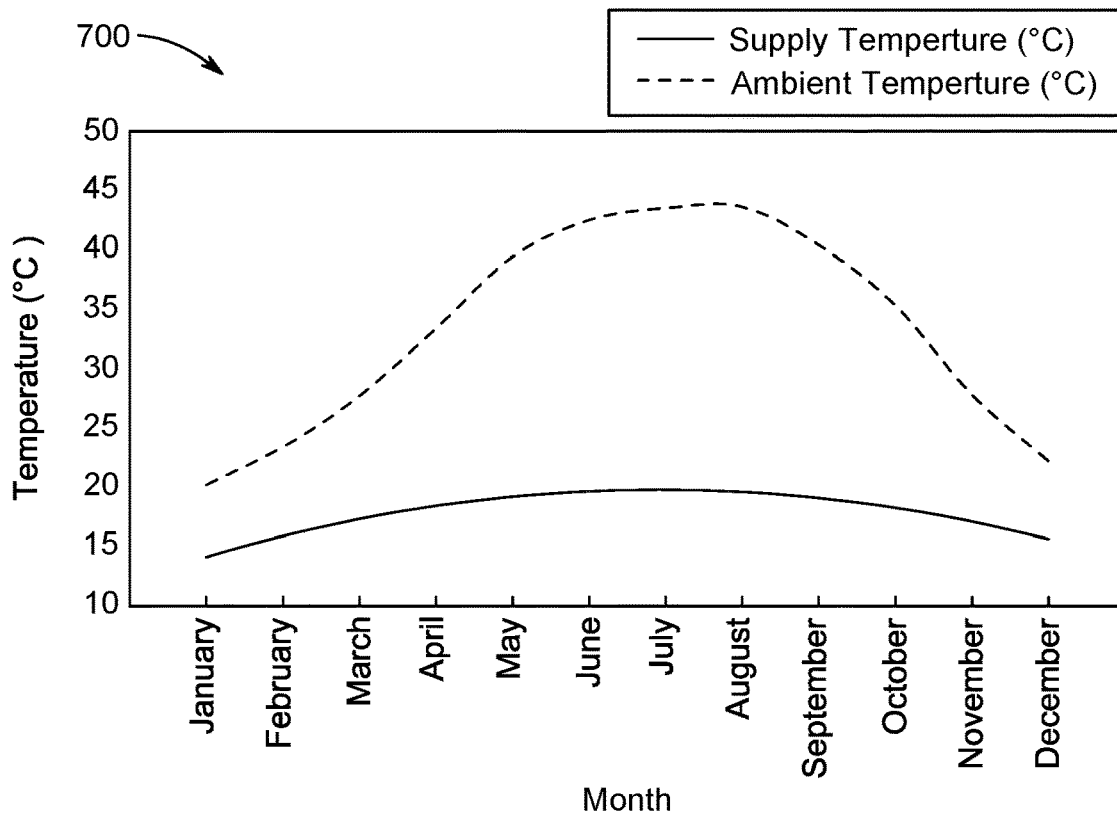
FIG. 7 is a graphical representation of monthly average temperature of supplied air as per the utilized data for the present disclosure.
Figure 8:
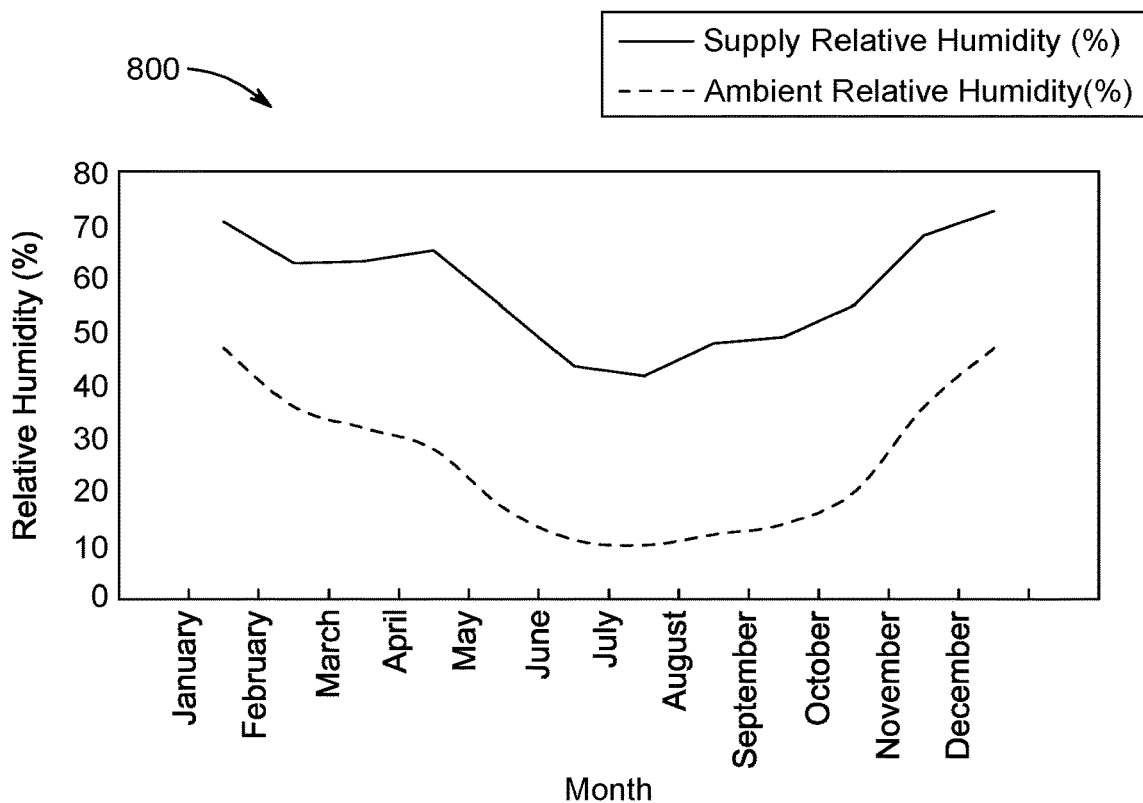
FIG. 8 is a graphical representation of monthly average relative humidity of the supplied air as per the utilized data for the present disclosure.

The monthly variations of the relative humidity and temperature of the supplied air are depicted in graph 700 and graph 800 of FIG. 7 and FIG. 8, respectively. The results show that the monthly average temperature of the supplied air ranges from 13.8° C. to 19.89° C. and the average relative humidity ranges from 51% to 72%. In Riyadh, the maximum temperature of 43.86° C. occurs in July. The temperature and relative humidity of the supplied air corresponding to July are 19.81° C. and 51° C., respectively. As shown in FIG. 7, for most of the year the supplied air properties in Riyadh fulfill the comfortable conditions except in the period between November and April, during which the humidity of the supplied air does not meet the comfortable condition, i.e., 50% to 60% relative humidity as shown in FIG. 8. However, most of these months represent the winter season, during which the maximum outdoor temperature is 27° C. Hence, the dependency on the AC system is at a minimum.

Figure 9:
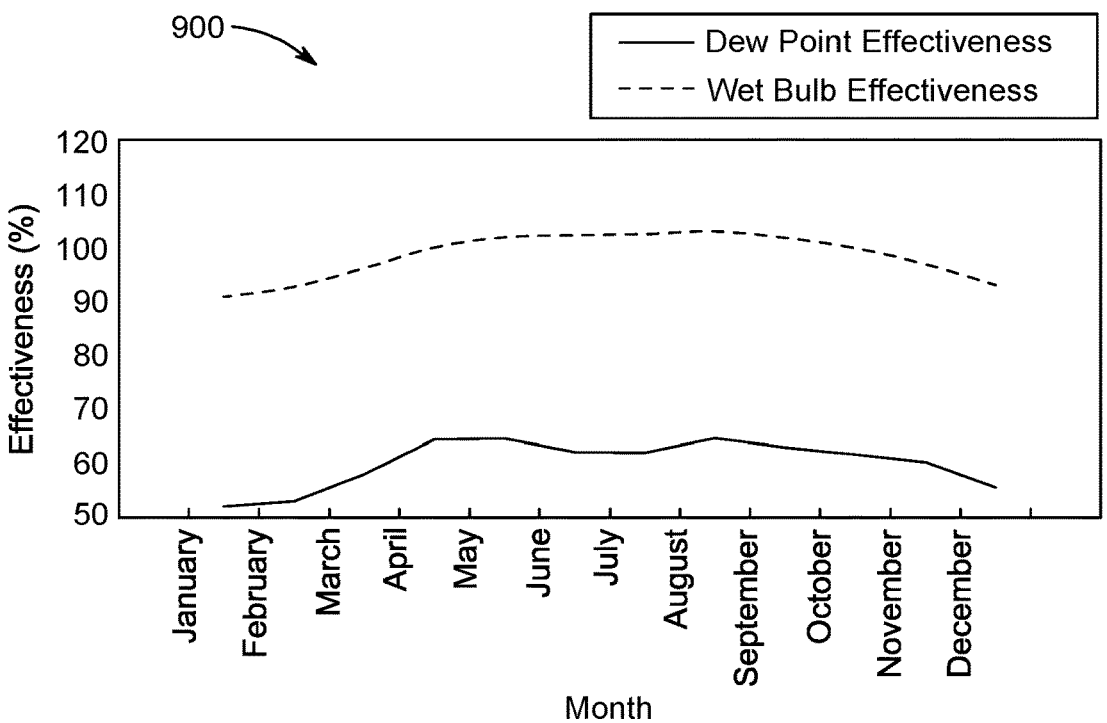
FIG. 9 is a graphical representation of cooling effectiveness as per the utilized data for the present disclosure.

FIG. 9 illustrates a graph 900 depicting the variation of dew point effectiveness and wet-bulb effectiveness. Cooling effectiveness and the ambient relative humidity are inversely related. The cooling effectiveness reaches its maximum in the summer months where the relative humidity is at its minimum. The value of the wet-bulb effectiveness exceeds 100% because it is estimated by dividing the temperature difference along the dry side by the difference in the wet bulb temperature of the inlet dry-bulb and the inlet.

Figure 10:
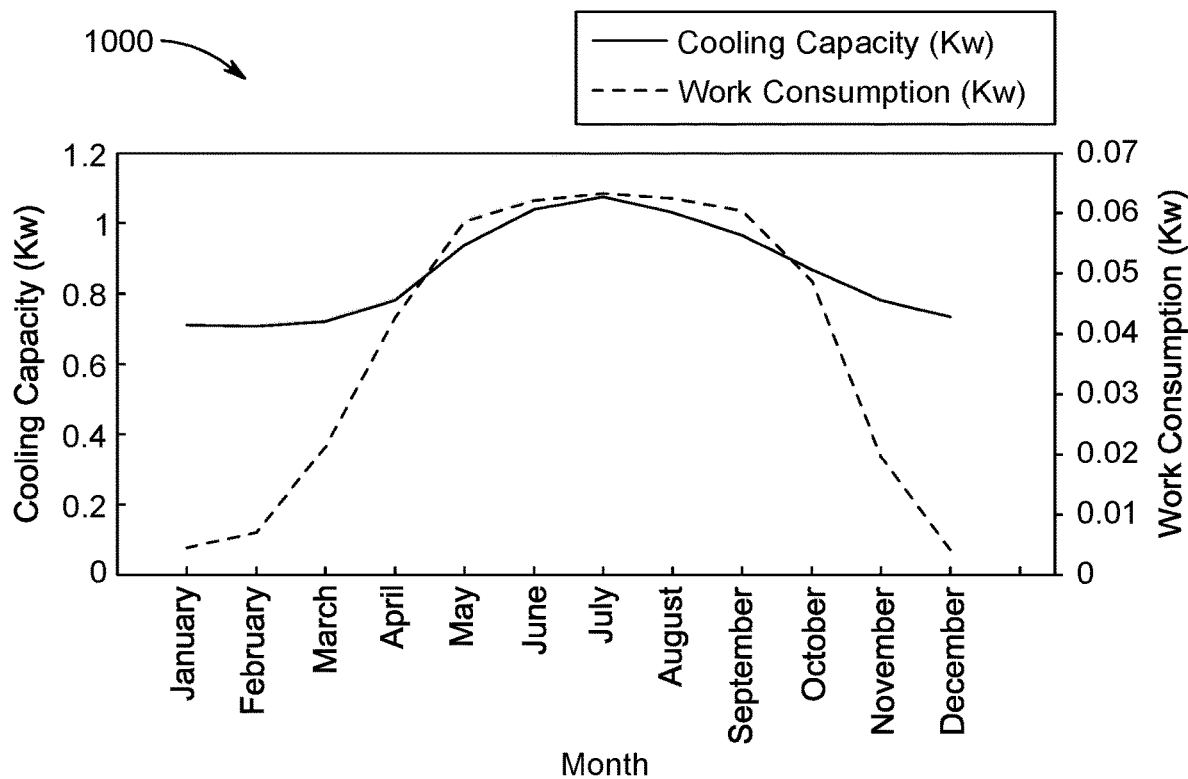
FIG. 10 is a graphical representation of cooling capacity and electrical energy used by the M-cycle based cooling system as per the utilized data for the present disclosure.
Figure 11:
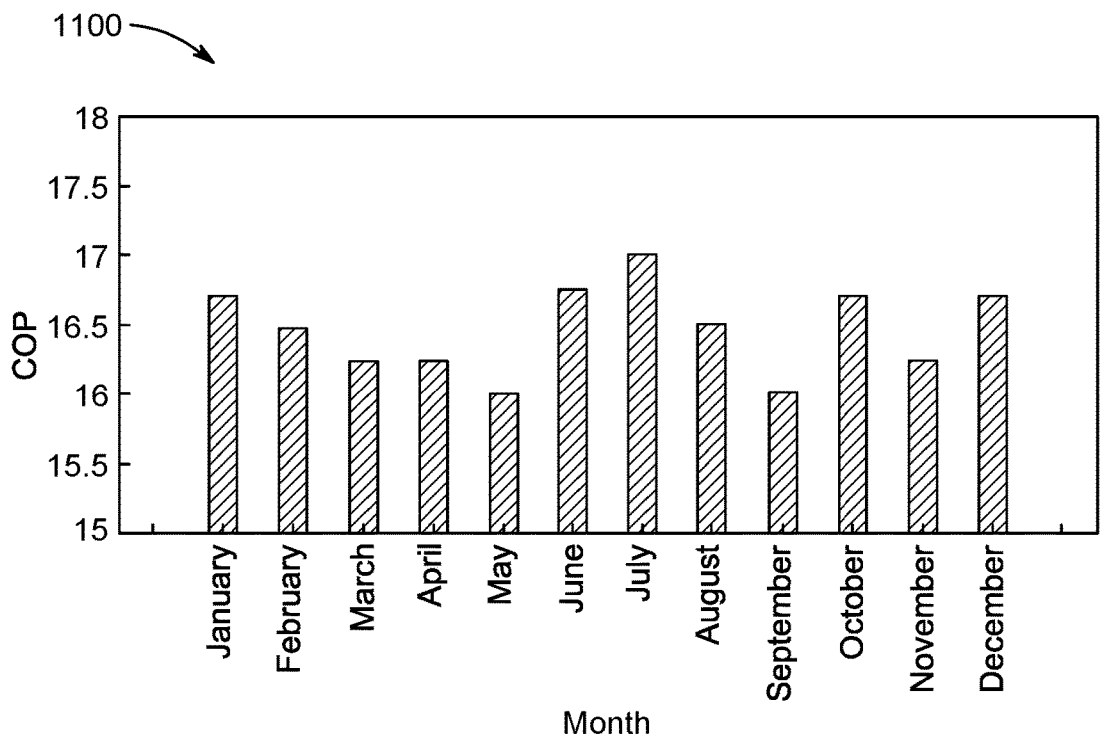
FIG. 11 is a graphical representation of variation of coefficient of performance (COP) for the M-cycle based cooling system as per the utilized data for the present disclosure.

The most important parameters for evaluating the performance of any cooling system are the cooling capacity, consumed electrical energy, and coefficient of performance (COP). Hence, the monthly variation of the cooling capacity of the proposed cooling system is depicted in graph 1000 of FIG. 10. Riyadh has a high cooling capacity due to its low relative humidity. The monthly variation of COP of the proposed cooling system is shown in a graph 1100 in FIG. 11. The trend of the monthly variation of COP is similar to that of the cooling capacity depicted in FIG. 10. The average monthly cooling capacity, and the COP of the system, with the cooling capacity ranging between 0.71 and 1.075 kW. The maximum cooling capacity is 1.07520 kW, and the corresponding COP is 17. These values are for July when the average ambient temperature is 43.6° C. The work consumption by the system is a function of both the humidity ratio and ambient temperature. Therefore, the results indicate that electrical energy decreases as the ambient temperature increases. The consumed electrical energy ranges between 0.0041 and 0.06325 kW. Hence, the results indicate that a cooling system based on the M-cycle yields a high COP compared to the conventional air conditioning systems. Moreover, M-cycle based cooling system requires 0.066325 kW of electrical energy to produce 1.075 kW of cooling capacity. This is equivalent to 88% of the electrical energy consumption of a vapor-compression refrigeration system with a similar cooling capacity. Thus, the performance of M-cycle based cooling system is higher considering that it uses energy only to drive the fan and pump, unlike a conventional system that uses electricity intensively to drive the compressor and the fan.

Figure 12:
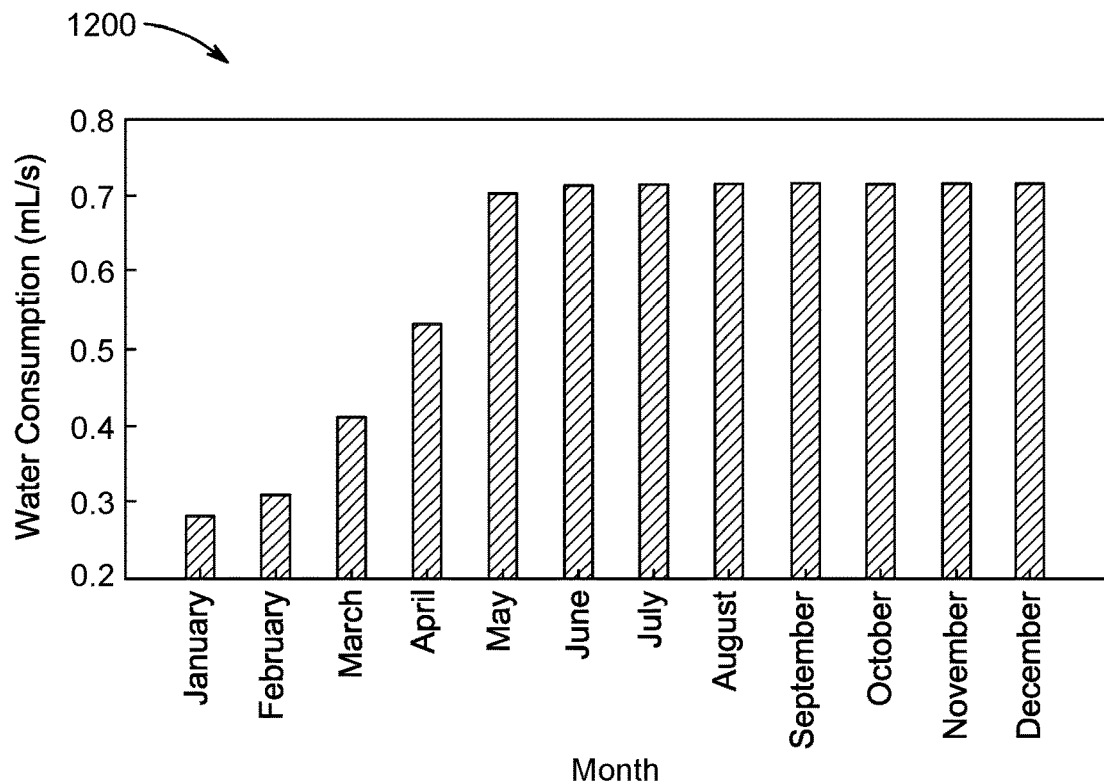
FIG. 12 is a graphical representation of variation of water consumption for the M-cycle based cooling system as per the utilized data for the present disclosure.
Figure 13:
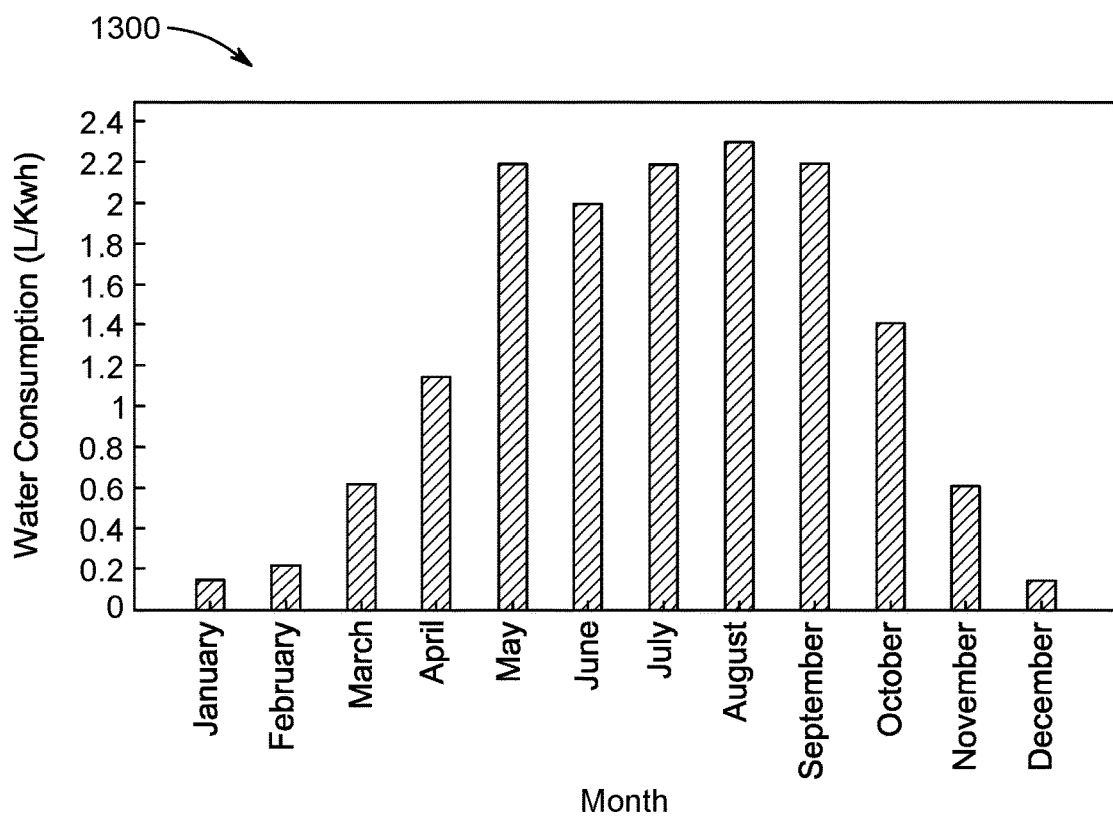
FIG. 13 is a graphical representation of variation of water consumption per kWh for the M-cycle based cooling system as per the utilized data for the present disclosure.

Theoretically, the evaporation rate of water is equal to the volume of moisture increase of the working air while passing the wet channel as described by Equation (18). FIG. 12 and FIG. 13 provide a graph 1200 and a graph 1300, respectively, which display the water consumption of the cooling system based on the M-cycle. The water consumption by the proposed cooling system in Riyadh city varies between 0.29 and 0.71 mL/s, and the maximum consumption occurs in August. The results demonstrate that a cooling system based on the M-cycle requires about 0.787 mL/s of water to reduce the air temperature in Riyadh from 43.9 to 19.8° C. equivalents to 1.05 kW of cooling (i.e., 2.3 L/KW). Using the developed model, the effect of different factors, including the channel spacing, length, inlet air velocity, temperature, humidity ratio, and extraction ratio, on the performance of the cooling system was investigated. The cooling performance of an evaporative cooling system is determined using the wet-bulb effectiveness computed based on the inlet and outlet air temperatures. The geometric aspects and flow conditions used for the parametric study are shown in Table 2 and Table 3.

Figure 14:
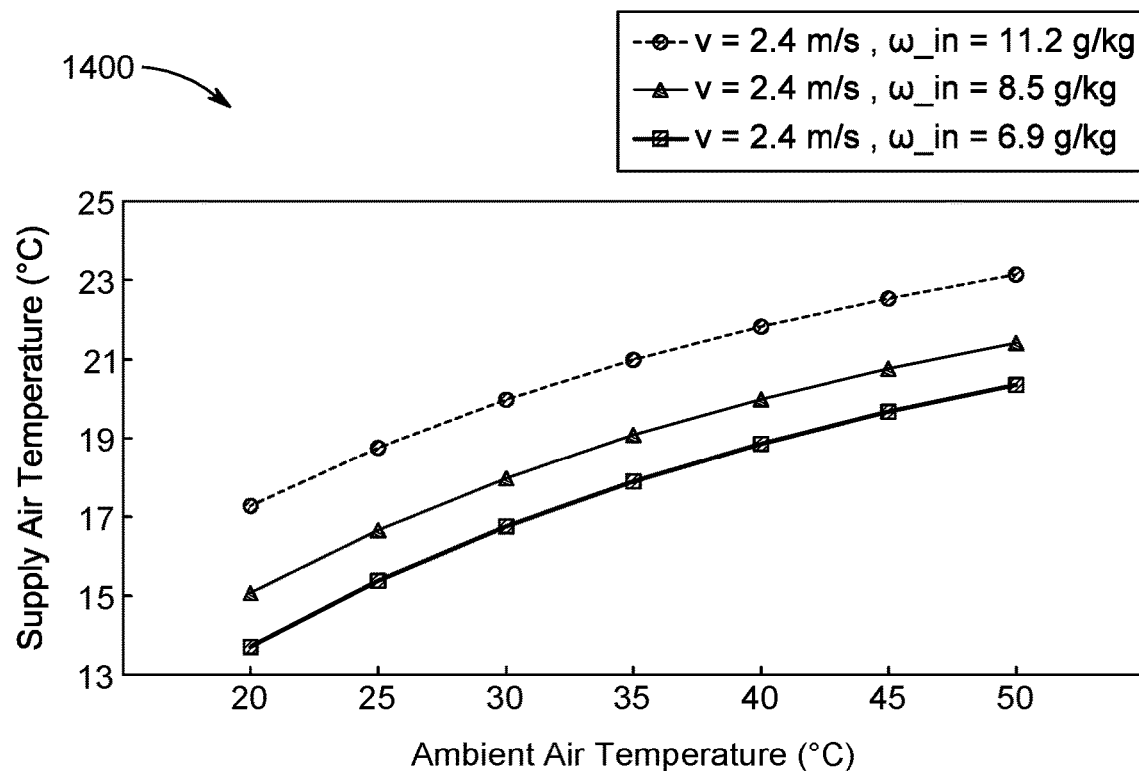
FIG. 14 is a graphical representation of supplied air temperature for different intake air conditions as per the utilized data for the present disclosure.

FIG. 14 provides a graph 1400 which depicts the effect of the temperature and humidity of the air at the inlet on the supplied air temperature. The results show that the supplied air temperature decreases as the inlet air temperature and humidity levels of entering air decreases. This is due to the enhanced evaporative heat transfer owing to the lower inlet air humidity ratio providing a greater driving force for mass transfer. Moreover, the temperature of the supplied air increases as the humidity of inlet air increases at a given temperature of the ambient air. Furthermore, the temperature of the inlet air increases almost linearly with the temperature of the supplied air. Considering that the slope of the curve of supplied air temperature versus the ambient temperature ranges between 0.1 and 0.3° C./deg, the supplied air temperature increases by 1-3° C. when the ambient air temperature increases by 10° C. Also, at the same temperature of the intake air, the supplied air temperature decreases by almost 3.6° C. per 4.3 g/kg reduction of absolute humidity. Finally, the results indicate that if absolute humidity is lower than 12.9 g/kg, as in the case of Riyadh city, the resulting supplied air temperature will be under 25° C.

Figure 15:
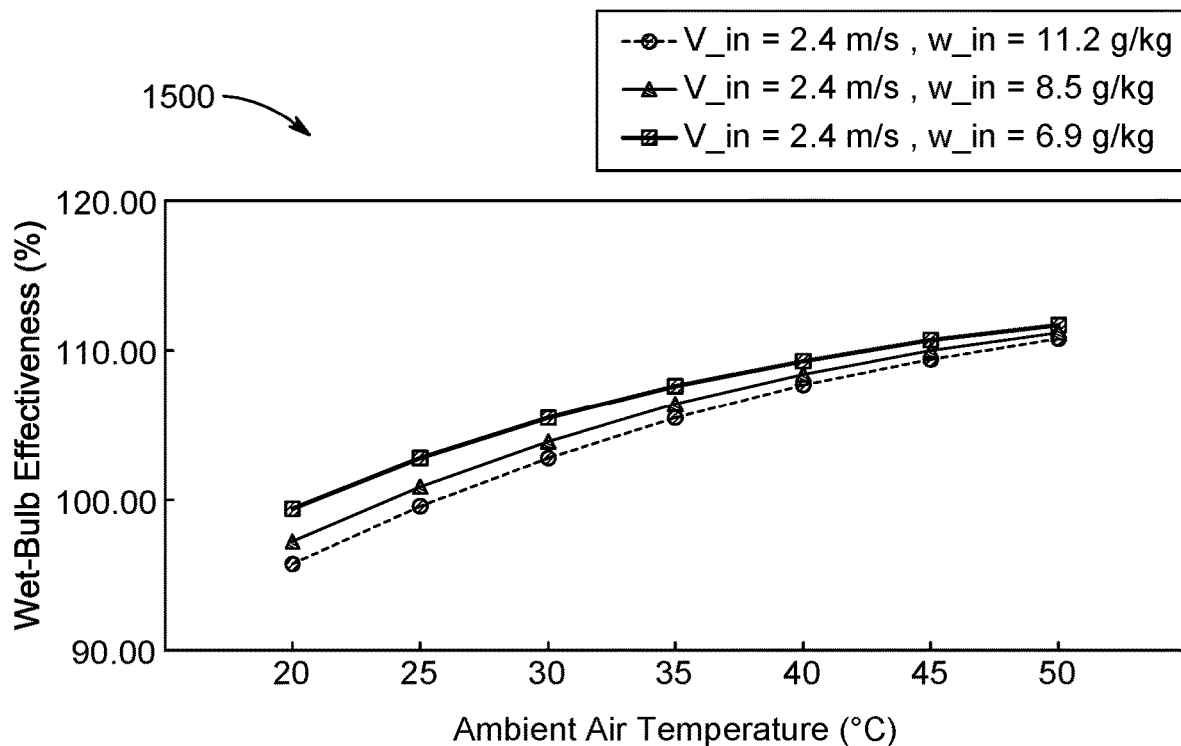
FIG. 15 is a graphical representation of wet-bulb effectiveness for different intake air conditions as per the utilized data for the present disclosure.
Figure 16:
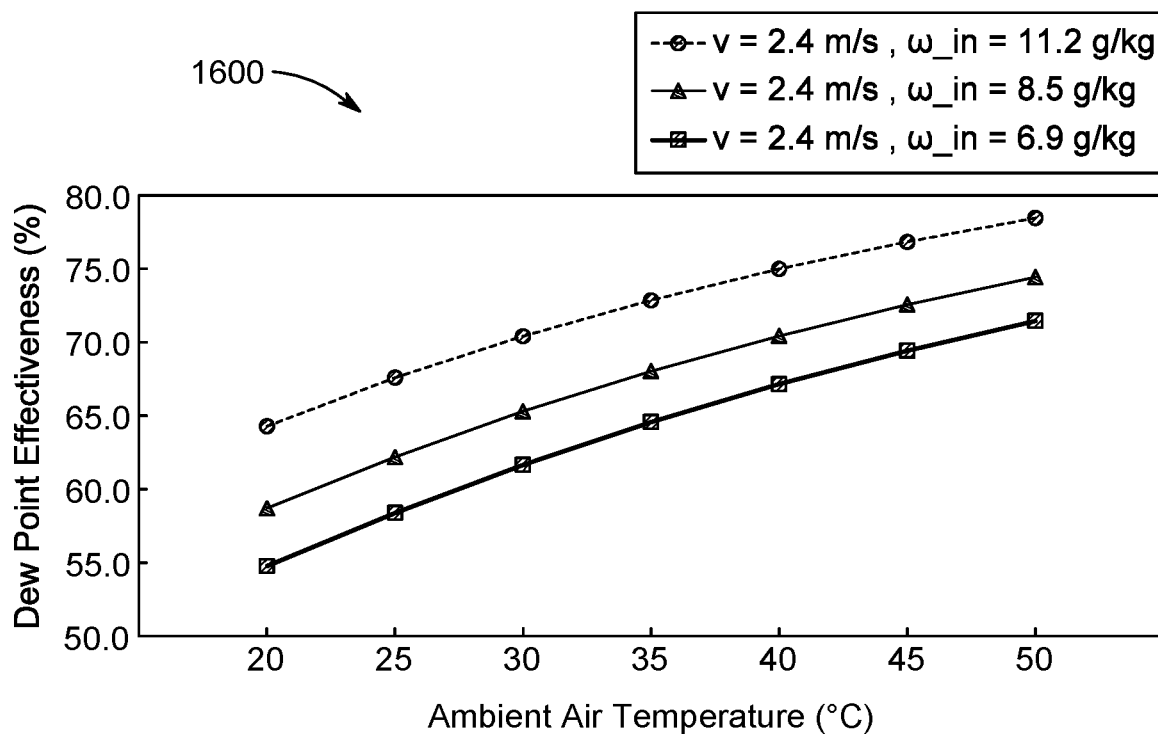
FIG. 16 is a graphical representation of dew point effectiveness for different intake air conditions as per the utilized data for the present disclosure.

FIG. 15 provides a graph 1500 which shows the wet-bulb effectiveness of the proposed system under different inlet air temperature and humidity conditions. When the ambient air temperature increases from 25° C. to 45° C. the wet-bulb effectiveness range between 95% and 110%. The driving force for mass transfer is increased due to the larger vapor pressure difference between the air and water interface owing to the low humidity ratio of the inlet air. A larger amount of sensible heat is transferred from the dry channel to the wet channel and the moisture absorbing-capacity of working air increases due to water evaporation when the driving force for mass transfer increases. Hence, when the humidity ratio of the inlet air is low, the wet-bulb effectiveness increases. Also, the wet-bulb effectiveness proportionately increases with the inlet air temperature. Graph 1600 in FIG. 16, on the other hand, indicates that the dew point effectiveness decreases as the humidity ratio of the inlet air decreases due to the temperature difference between the inlet dry bulb and dew point temperature, which increases rapidly at low values of the humidity ratio.

Figure 17:
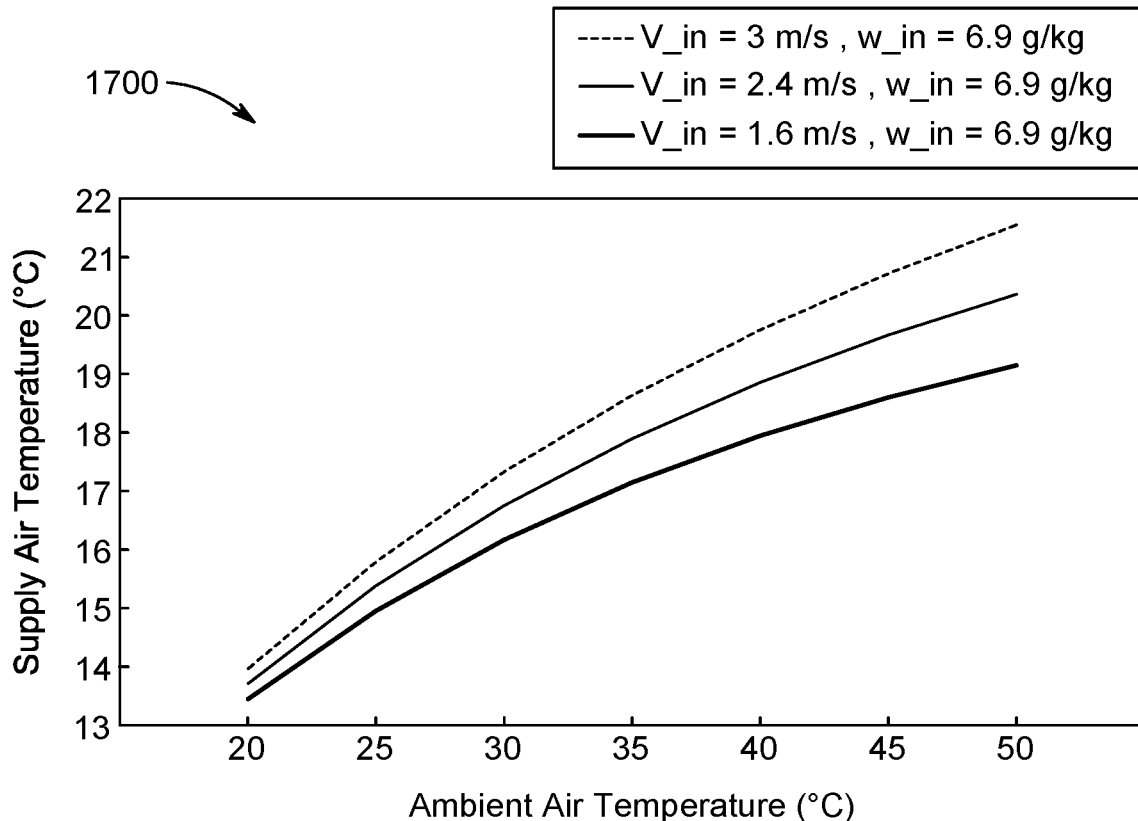
FIG. 17 is a graphical representation of effect of the variation of the intake air velocity on the supplied air temperature as per the utilized data for the present disclosure.
Figure 18:
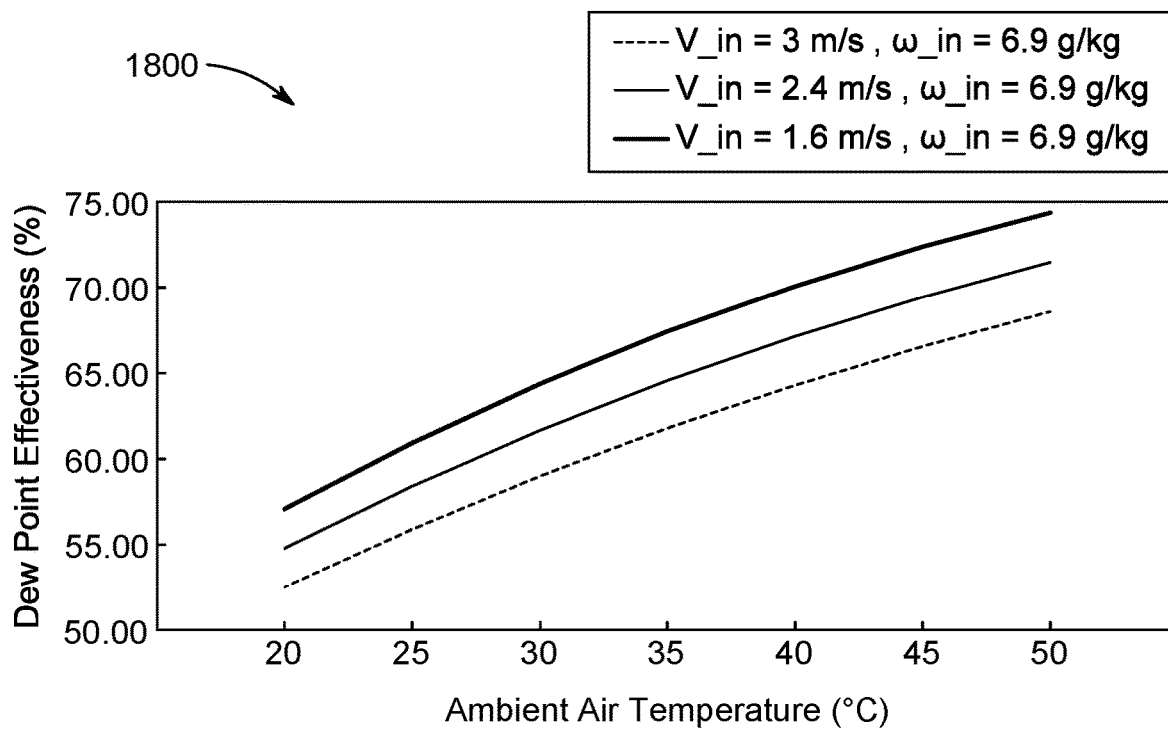
FIG. 18 is a graphical representation of effect of variation of the intake air velocity on the dew point effectiveness as per the utilized data for the present disclosure.
Figure 19:
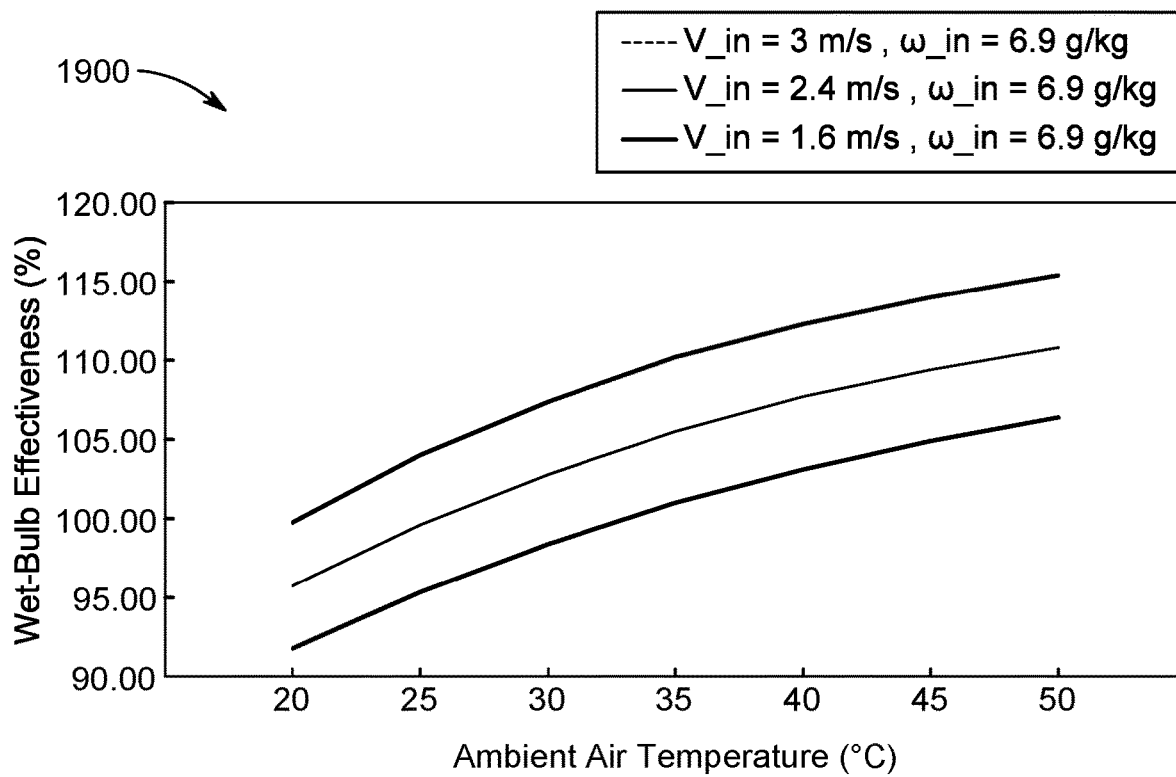
FIG. 19 is a graphical representation of effect of variation of the intake air velocity on the wet-bulb effectiveness as per the utilized data for the present disclosure.

FIG. 17 provides a graph 1700 which depicts the relationship between the inlet air velocity and the supplied air temperature. Cooling is higher for the same air temperature and humidity level at the inlet at lower velocities. Moreover, as illustrated in graph 1800 of FIG. 18 and graph 1900 of FIG. 19, increased inlet velocity significantly decreases both dew point effectiveness and wet-bulb effectiveness, respectively. A shorter contact time with the wet surface at higher velocities decreases the evaporation of the water film, increasing the temperature of the supplied air and the decrease of both dew point effectiveness and wet-bulb effectiveness.

Figure 20:
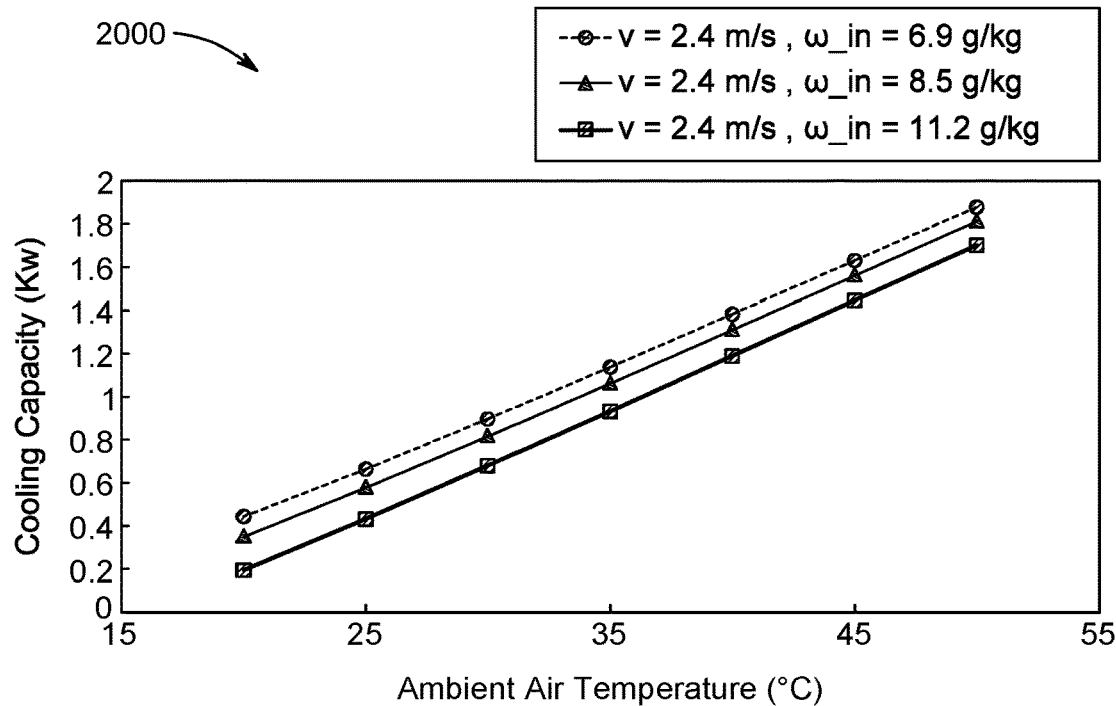
FIG. 20 is a graphical representation of effect of humidity and temperature of the intake air on the specific cooling capacity as per the utilized data for the present disclosure.

Further, the results depicted in graph 2000 of FIG. 20 indicate that, the cooling of the supplied air decreases as the humidity level of the inlet ambient air increases, and hence for the same temperature and velocity the cooling performance of the system decreases. Sensible heat is transferred from the dry side to the wet side of the channel wall due to the higher heat capacity of the working air compared to that of the water film owing to the lower humidity ratio of the inlet air.

Figure 21:
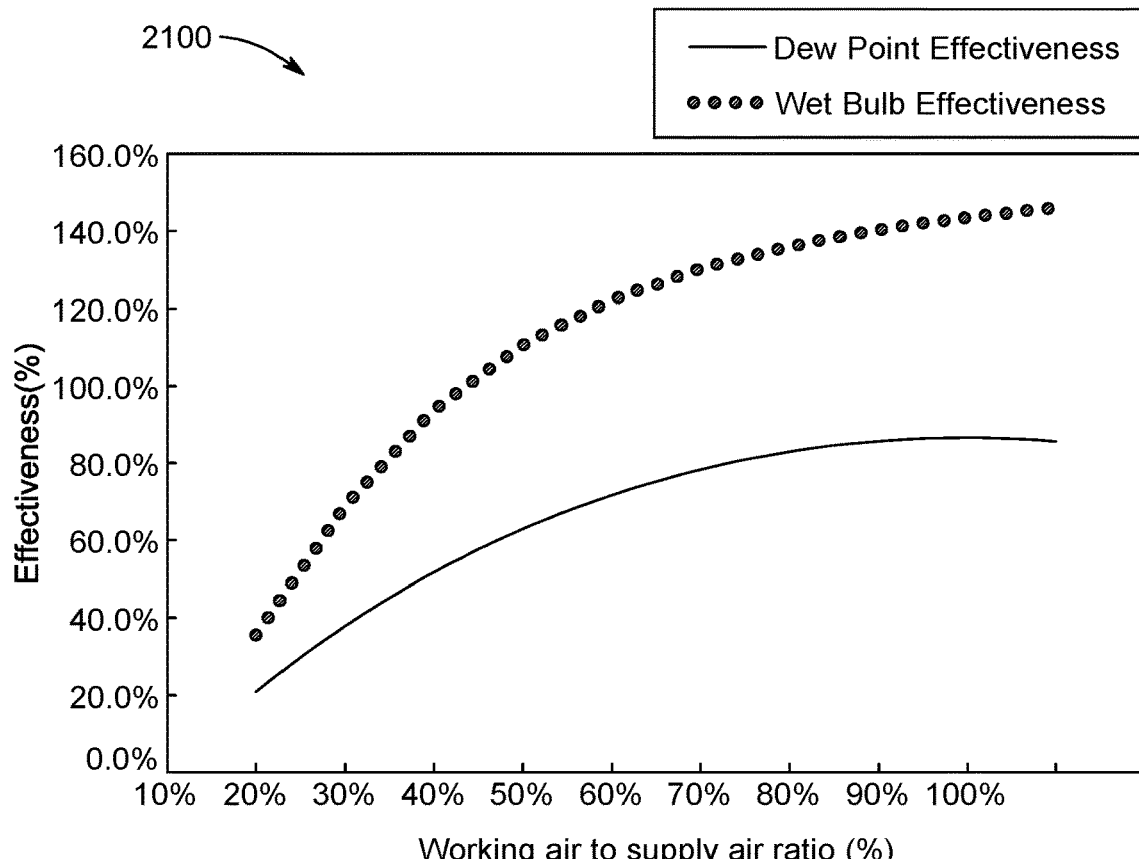
FIG. 21 is a graphical representation of dependence of the dew-point effectiveness and the wet-bulb effectiveness on the working air to supply air ratio as per the utilized data for the present disclosure.

The dependence of the dew point effectiveness and wet-bulb effectiveness on the working air to supplied air ratio is depicted in graph 2100 of FIG. 21. Even though a higher working air to supply air ratio improves the cooling effectiveness, it decreases the supply air flow rate and thus, can reduce the cooling capacity of the system. As the heat removed from the dry channel depends on the amount of air available in the wet channel, the reduction in cooling capacity is due to the increase of the water evaporation in the wet channel, owing to the increasing ratio of the working air. Moreover, the results show that the working air to supplied air ratio should be between 0.30 and 0.63. Higher values of this ratio adversely affect the temperature of the supplied air due to its effect on the cooling effectiveness of the dew point cooling system and the efficiency.

Figure 22:
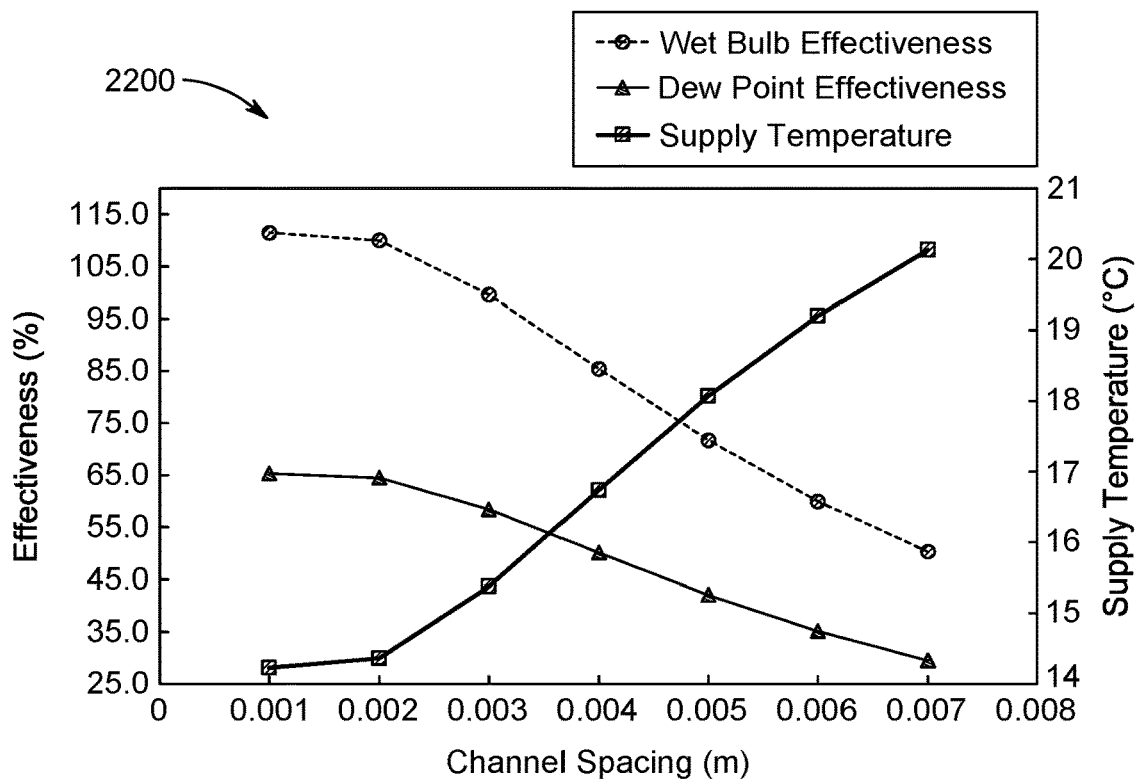
FIG. 22 is a graphical representation of influence of channel gap on the cooling effectiveness and the supplied air temperature as per the utilized data for the present disclosure.

FIG. 22 provides a graph 2200 which shows how the supply temperature, the wet-bulb effectiveness, and dew point effectiveness vary with the channel gap under constant inlet air conditions. The results show that both wet-bulb effectiveness and dew point effectiveness vary inversely with the channel gap. Moreover, the results in FIG. 22 show that the temperature of the supplied air increases as the channel spacing is increased. The observed effects of the channel spacing are due to the increase of the heat and mass transfer coefficients as the channel spacing is decreased (from equations 21-23). When the channel spacing is smaller than about 4 mm the wet-bulb effectiveness is higher than unity. To provide a system with high cooling effectiveness and wet-bulb effectiveness greater than 100%, the channel gap should be maintained below 4 mm. However, higher values of dew point effectiveness do not produce the lowest outlet air temperature owing to the dew point temperature of humid air being higher than that of dry air. Thus, the dew point effectiveness imposes a theoretical limit on the extent of the cooling of supplied air.

Figure 23:
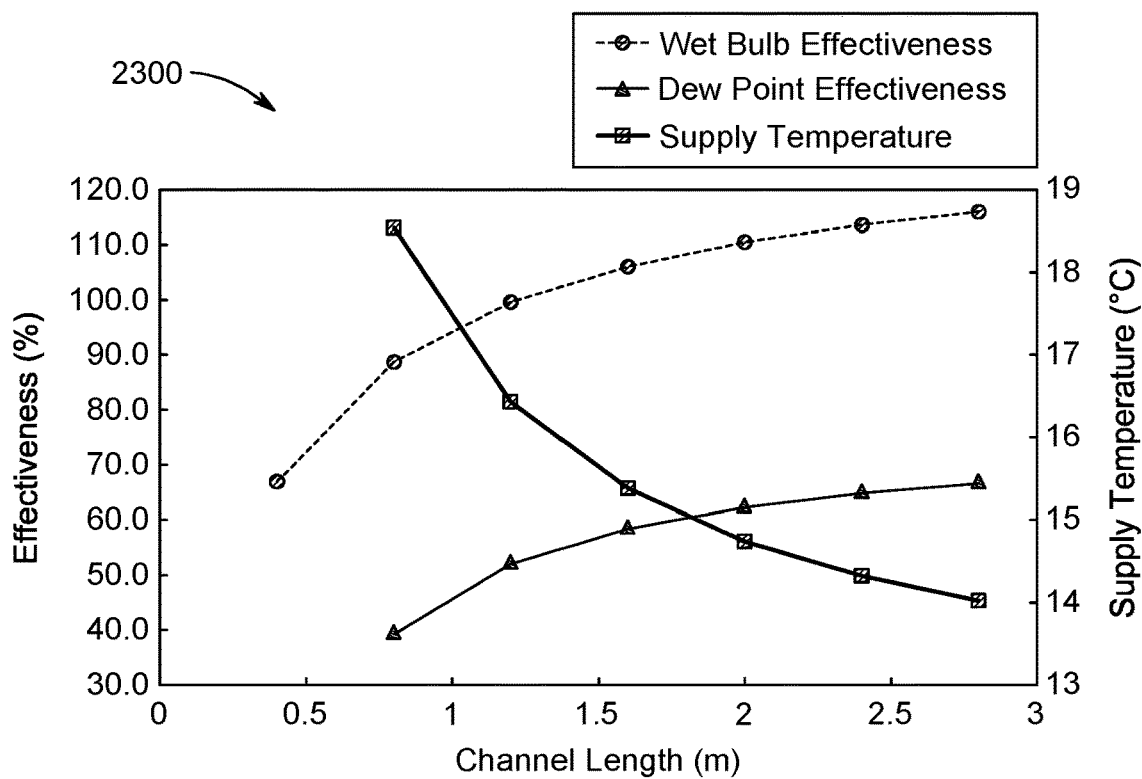
FIG. 23 is a graphical representation of influence of channel length on the cooling effectiveness and the supplied air temperature as per the utilized data for the present disclosure.

Further, FIG. 23 provides a graph 2300 which shows the effects of the channel length on the dew point effectiveness, wet-bulb effectiveness, and the supplied air temperature. When the channel length is increases, both dew point effectiveness and wet-bulb effectiveness increase, and supply air temperature decrease from 18.72° C. to 14° C. This is due to the increased time and contact area between the air and water in the wet channel owing to the higher length of the channel enhancing the heat and mass transfer process. However, the increased cost of a larger unit and the operation cost due to higher friction losses should be considered when optimizing the system. A channel length higher than about 1 m can provide wet-bulb effectiveness greater than unity. However, the extra power required by the fan to overcome additional resistance due to the longer channel must also be taken into consideration.

In the embodiments of the present disclosure, the M-cycle-based cooling system integrated with an ablution greywater treatment system for mosques located in hot and dry climatic zones was proposed. In addition, a mathematical model has been developed to assess the performance of the cooling system using a variation of Newton's method. The mathematical model addressed the heat and mass transfer aspects and was solved through Engineering Equation Solver (EES). The results show that the monthly average temperature of the supplied air ranges from 13.8° C. to 19.89° C., and the average relative humidity ranges from 51% to 72%. A channel length higher than about 1.2 m would provide wet-bulb effectiveness greater than unity. However, the extra power required by the fan to overcome additional resistance due to the longer channel should be taken into consideration in the optimization stage. There is about 10% decrease of the wet-bulb effectiveness and the dew point effectiveness of the system with the increase of the temperature of water from 19 to 23° C., the temperature ranges of normal tap water. Thus, the water temperature has a negligible effect on the performance of an air conditioning system based on the M-cycle. Moreover, the results show that the working air to supply air ratio must be within the range of 0.30 to 0.63, as the efficiency and cooling effectiveness of the system will be affected by higher values of this ratio and consequently affect the temperature of the supplied air. Furthermore, the results show that the effectiveness of the system and the supplied air temperature is influenced by the humidity ratio. As the humidity ratio increases, both the supplied air temperature and the dew point effectiveness increase. As the ambient air temperature increases by 10° C., the temperature of the supplied air increases in the range of 1-3° C. Also, every 4.3 g/kg decrease of absolute humidity decreases the supplied air temperature by about 3.6° C. at a given intake air temperature. The results also show that if the absolute humidity is less than 12.9 g/kg, which is the case in hot and dry climatic zones such as Riyadh city, the temperature of the supplied air will be less than 25° C. The water consumption by the system varies from 0.29 to 0.71 mL/s, where the maximum consumption rate is expected to occur during August. A wet-bulb effectiveness of about 120% can be achieved with an inlet air velocity of 1.6 m/s and working air to supply air ratio of 33%. The average COP of the proposed cooling system is about 16.2. However, its performance is highly dependent on the climate and may not be suitable for all weather conditions. The proposed ablution greywater treatment system can provide 20% to 50% of the water required by the cooling system from a free source of lightly polluted water.

Obviously, numerous modifications and variations of the present invention are possible in light of the above teachings. It is therefore to be understood that, within the scope of the appended claims, the invention may be practiced otherwise than as specifically described herein.

The invention claimed is:

1. An evaporative cooling system for cooling an ablution bay, comprising:
   the ablution bay comprising:
   a plurality of water taps; and
   a greywater drainage below the plurality of water taps;
   a greywater storage tank having first and second sides; and
   an evaporative cooler apparatus;
   wherein the ablution bay is adjacent to or contained in a space to be cooled;
   the greywater storage tank is fluidly connected to the greywater drainage system of the ablution bay through a piping network at least partially below the ablution bay and/or the space to be cooled;
   the greywater storage tank is fluidly connected via an outlet to a water pump on the first side of the greywater storage tank, the outlet being positioned at a mid-height of the greywater storage tank, and the greywater storage tank is fluidly connected to the greywater drainage system of the ablution bay on the second side;
   wherein the greywater storage tank comprises a plurality of heat pipes connected on one end perpendicularly to a wall of the greywater storage tank extending outwards; and
   the plurality of heat pipes are equally spaced around the wall of the greywater storage tank;
   wherein the water pump is fluidly connected to a top of an evaporative cooler apparatus and the evaporative cooler apparatus is located above the space to be cooled in a dome shaped housing;
   wherein the evaporative cooler apparatus comprises;
   a wet channel;
   at least one spray nozzle; and
   a dry channel;
   wherein the at least one spray nozzle is located at the top of the evaporative cooler apparatus and is fluidly connected to the water pump;
   wherein the at least one spray nozzle is connected to the wet channel;
   the wet channel comprises a plurality of parallel plates and is located directly above the dry channel;
   a first side of the dry channel is connected to a first opening with a fan and outside air;
   a first side of the wet channel is connected to a first opening to outside air;
   wherein the first openings of the wet and dry channels are located on a back side of the dome shaped housing facing the opposite direction of an entrance to the space to be cooled.

2. The evaporative cooling system of claim 1, wherein:
   the dome shaped housing is coated with an infrared light reflective material selected from the group consisting of an acrylic polymer, asphalt, a polyurethane polymer, and a silicone polymer.

3. The evaporative cooling system of claim 1, wherein each of the plurality of heat pipes comprises:
   a copper enclosure with a copper sintered wick structure extending along a length of the heat pipe; and
   an evaporator section; and
   a condenser section.

4. The evaporative cooling system of claim 1, further comprising:
   at least one louver covering at least one of the first openings of the wet and dry channels on the back side of the dome shaped housing.

5. The evaporative cooling system of claim 1, further comprising:
   a condenser;
   wherein a first end of the condenser is connected to the first opening of the wet channel of the evaporative cooler apparatus; and
   wherein a second end of the condenser is fluidly connected to at least one spray nozzle located at the top of the evaporative cooler apparatus.

6. The evaporative cooling system of claim 1, further comprising:
   a float chamber located inside the greywater storage tank,
   wherein the float chamber is configured to regulate a level of water in the greywater storage tank, and fluidly connect with each of the greywater storage tank and the greywater drainage system of the ablution bay.

7. The evaporative cooling system of claim 1, wherein:
   the greywater drainage system of the ablution bay is fluidly connected to a sewage drain.

8. The evaporative cooling system of claim 1, further comprising:
   a greywater filtration system, wherein at least one filter is fluidly connected between the greywater storage tank and the evaporative cooler apparatus.

9. The evaporative cooling system claim 8, further comprising:
   a treated water storage tank,
   wherein the treated water storage tank is fluidly connected between the greywater filtration system and the evaporative cooler apparatus; and
   wherein the treated water storage tank comprises a chlorine dispenser.

10. The evaporative cooling system of claim 8, wherein:
    the at least one filter of the greywater filtration system is selected from the group consisting of a ceramic filter, an activated carbon filter, and a UV filter.

11. The evaporative cooling system of claim 1, further comprising:
    a closed alternative water storage tank,
    wherein the closed alternative water storage tank is fluidly connected to at least one spray nozzle in the evaporative cooler apparatus.

12. The evaporative cooling system of claim 11, further comprising:
a water level sensor in the greywater storage tank,
wherein if the water level sensor senses that water in the greywater storage tank is below 30%, the closed alternative water storage tank opens.

13. The evaporative cooling system of claim 1, wherein:
a plurality of indirect evaporative cooling systems is configured to operate concurrently for the space to be cooled.

14. The evaporative cooling system of claim 1, wherein:
each of the wet channel and the dry channel of the evaporative cooler apparatus comprises a length in a range of 90-150 cm and a width in a range of 5-15 cm, and
wherein a gap between the wet channel and the dry channel is less than 4 mm.

* * * * *